US008025566B2

(12) United States Patent
Walker et al.

(10) Patent No.: US 8,025,566 B2
(45) Date of Patent: Sep. 27, 2011

(54) GAMING DEVICE METHODS AND APPARATUS EMPLOYING AUDIO/VIDEO PROGRAMMING OUTCOME PRESENTATION

(75) Inventors: Jay S. Walker, Ridgefield, CT (US); Geoffrey M. Gelman, Boston, MA (US); Stephen C. Tulley, Fairfield, CT (US); James A. Jorasch, New York, NY (US); David F. Zucker, Winnetka, IL (US)

(73) Assignee: IGT, Reno, NV (US)

( * ) Notice: Subject to any disclaimer, the term of this patent is extended or adjusted under 35 U.S.C. 154(b) by 1351 days.

(21) Appl. No.: 10/908,688

(22) Filed: May 23, 2005

(65) Prior Publication Data

US 2006/0003830 A1 Jan. 5, 2006

Related U.S. Application Data

(63) Continuation-in-part of application No. 10/417,758, filed on Apr. 16, 2003, now abandoned.

(60) Provisional application No. 60/581,558, filed on Jun. 21, 2004.

(51) Int. Cl.
*G06F 17/00* (2006.01)

(52) U.S. Cl. ................ 463/25; 463/16; 463/20; 463/40; 463/42; 463/30

(58) Field of Classification Search .................. None
See application file for complete search history.

(56) References Cited

U.S. PATENT DOCUMENTS

| 4,621,814 | A | 11/1986 | Stepan et al. ............. 273/138 A |
| 4,926,327 | A | 5/1990 | Sidley |
| 5,237,157 | A | 8/1993 | Kaplan |
| 5,259,613 | A | 11/1993 | Marnell, II ................ 273/138 A |
| 5,429,361 | A | 7/1995 | Raven et al. |
| 5,462,275 | A | 10/1995 | Lowe et al. |
| 5,488,411 | A | 1/1996 | Lewis |
| 5,491,777 | A | 2/1996 | Mase et al. |
| 5,530,852 | A | 6/1996 | Meske, Jr. et al. |

(Continued)

FOREIGN PATENT DOCUMENTS

WO    WO 95/30944    * 11/1995

(Continued)

OTHER PUBLICATIONS

Beyer, Andrew, "Tracks Without Horses; Teletrack has Drawbacks; Opening Day at Teletrack", The Washington Post, Oct. 25, 1979, Section: Sports, F1.

(Continued)

*Primary Examiner* — Paul A. D'Agostino
(74) *Attorney, Agent, or Firm* — K&L Gates LLP

(57) ABSTRACT

In a first aspect, a method (e.g., of operating a gaming device) is provided. The method includes the steps of (i) receiving audio/video content; (ii) associating a plurality of sets of outcome values with the audio/video content; (iii) determining a play session; (iv) determining which of the plurality of sets of outcome values to associate with the audio/video content for a duration of the play session, thereby determining an active set of outcome values; (v) determining a result of a game play during the session; (vi) selecting, based on the result, a value from the active set of outcome values; and (vii) outputting, as an indication of the result, the audio/video content and an indication of the selected value.

6 Claims, 10 Drawing Sheets

U.S. PATENT DOCUMENTS

| | | | |
|---|---|---|---|
| 5,550,561 A | 8/1996 | Ziarno | |
| 5,590,197 A | 12/1996 | Chen et al. | |
| 5,592,212 A | 1/1997 | Handelman | |
| 5,592,375 A | 1/1997 | Salmon et al. | |
| 5,594,661 A | 1/1997 | Bruner et al. | |
| 5,638,426 A | 6/1997 | Lewis | |
| 5,646,988 A | 7/1997 | Hikawa | |
| 5,675,828 A | 10/1997 | Stoel et al. | |
| 5,695,401 A | 12/1997 | Lowe et al. | |
| 5,752,882 A | 5/1998 | Acres et al. | |
| 5,761,647 A | 6/1998 | Boushy | |
| 5,823,872 A | 10/1998 | Prather et al. | 463/6 |
| 5,839,960 A | 11/1998 | Parra et al. | |
| 5,935,002 A | 8/1999 | Falciglia | |
| 5,971,271 A | 10/1999 | Wynn et al. | |
| 5,997,400 A | 12/1999 | Seelig et al. | 463/6 |
| 6,080,063 A | 6/2000 | Khosla | |
| 6,095,921 A | 8/2000 | Walker et al. | 463/20 |
| 6,113,495 A | 9/2000 | Walker et al. | 463/42 |
| 6,135,885 A | 10/2000 | Lermusiaux | 463/20 |
| 6,139,431 A | 10/2000 | Walker et al. | |
| 6,146,276 A | 11/2000 | Okuniewicz | |
| 6,186,893 B1 | 2/2001 | Walker et al. | 463/20 |
| 6,190,256 B1 | 2/2001 | Walker et al. | |
| 6,193,610 B1 | 2/2001 | Junkin | |
| 6,210,275 B1 | 4/2001 | Olsen | |
| 6,234,896 B1 | 5/2001 | Walker et al. | 463/16 |
| 6,302,790 B1 | 10/2001 | Brossard | 463/20 |
| 6,319,123 B1 | 11/2001 | Paludi | |
| 6,358,150 B1 | 3/2002 | Mir et al. | |
| 6,375,568 B1 | 4/2002 | Roffman et al. | 463/26 |
| 6,375,570 B1 | 4/2002 | Poole | 463/31 |
| 6,390,917 B1 | 5/2002 | Walker et al. | 463/20 |
| 6,406,369 B1 | 6/2002 | Baerlocher et al. | 463/20 |
| 6,500,068 B2 | 12/2002 | Walker et al. | 463/25 |
| 6,544,121 B2 | 4/2003 | DeWeese et al. | |
| 6,554,703 B1 | 4/2003 | Bussick et al. | |
| 6,561,906 B2 | 5/2003 | Suzuki | |
| 6,582,310 B1 | 6/2003 | Walker et al. | |
| 6,592,457 B1 * | 7/2003 | Frohm et al. | 463/16 |
| 6,599,192 B1 * | 7/2003 | Baerlocher et al. | 463/25 |
| D484,550 S * | 12/2003 | Seelig et al. | D21/370 |
| 6,656,046 B1 | 12/2003 | Yoseloff et al. | |
| 6,729,955 B2 | 5/2004 | Bennett et al. | |
| 6,758,756 B1 | 7/2004 | Horigami et al. | |
| 6,780,105 B1 * | 8/2004 | Kaminkow | 463/16 |
| 6,780,111 B2 * | 8/2004 | Cannon et al. | 463/25 |
| 6,786,824 B2 | 9/2004 | Cannon | |
| 6,801,261 B1 | 10/2004 | Haynes | |
| 6,835,132 B2 * | 12/2004 | Bennett | |
| 6,846,238 B2 | 1/2005 | Wells | |
| 6,848,996 B2 * | 2/2005 | Hecht et al. | 463/35 |
| 6,852,030 B2 * | 2/2005 | Baerlocher et al. | 463/25 |
| 6,860,810 B2 * | 3/2005 | Cannon et al. | 463/20 |
| 6,863,606 B1 * | 3/2005 | Berg et al. | 463/16 |
| 6,923,718 B2 * | 8/2005 | Brossard | |
| 6,970,859 B1 * | 11/2005 | Brechner et al. | |
| 7,241,219 B2 * | 7/2007 | Walker et al. | |
| 7,371,175 B2 * | 5/2008 | Gilboy et al. | 463/35 |
| 2001/0004607 A1 | 6/2001 | Olsen | |
| 2002/0034980 A1 * | 3/2002 | Lemmons et al. | |
| 2002/0072411 A1 | 6/2002 | Matsuura et al. | |
| 2002/0160826 A1 | 10/2002 | Gomez et al. | |
| 2002/0196342 A1 * | 12/2002 | Walker et al. | |
| 2003/0033157 A1 * | 2/2003 | Dempski et al. | 705/1 |
| 2003/0060275 A1 * | 3/2003 | Hughs-Baird | |
| 2003/0060281 A1 * | 3/2003 | Vancura | 463/30 |
| 2003/0066089 A1 * | 4/2003 | Andersen | |
| 2003/0100361 A1 * | 5/2003 | Sharpless et al. | 463/25 |
| 2003/0119578 A1 * | 6/2003 | Newson | 463/20 |
| 2003/0125107 A1 * | 7/2003 | Cannon | 463/25 |
| 2003/0190945 A1 * | 10/2003 | Bussick et al. | |
| 2003/0211881 A1 * | 11/2003 | Walker et al. | |
| 2004/0014524 A1 * | 1/2004 | Pearlman | |
| 2004/0209692 A1 * | 10/2004 | Schober et al. | 463/42 |
| 2005/0070351 A1 * | 3/2005 | Reeves | 463/16 |
| 2005/0096125 A1 * | 5/2005 | LeMay | |
| 2010/0137045 A2 * | 6/2010 | Angelopoulos | 463/1 |

FOREIGN PATENT DOCUMENTS

WO   WO 02/24288   *   3/2002

OTHER PUBLICATIONS

Milbert, Neil, "Win, Place, Showtime Teletrack Theatre is a Hit in Connecticut", Chicago Tribune, Jun. 26, 1987, Section: Sports, p. 1, Zone: C.

"Strategy Analytics: Enhanced TV and Interactive Games to Dominate $1.8 Billion Interactive TV Market; 72 Million Europeans Have Access to Interactive TV", Business Wire, Sep. 10, 2002.

Shah, Rawn, "Suggestions for Information Kiosk Systems Using the World Wide Web", The World Wide Web Information Kiosks Special Interest Group, Apr. 30, 1994. (5 pages).*

Christiansen, Eugene Martin, "Gaming and Entertainment—An Imperfect Union?", Cornell Hotel & Restaurant Administration Quarterly, Apr. 1995, Section: vol. 36, No. 2, p. 79, ISSN: 0010-8804. (19 pages).*

"Takasago Denki to offer Video-On-Demand Game Machines", COMLINE Daily News Computers, Apr. 4, 1995. (1 page).*

Schafer, Sarah, "Street Cruising", Technology Inc., 1996, No. 2, p. 19, Ref. No. 16960191. (2 pages).*

Roger, Dennis, "tpNet ready to help in the hunt for NZ products", The Press, Jul. 23, 1996, Section: Features, Computers, p. 24, Computers & Business Techonology. (1 page).*

Evenson, Laura, "Back in the Game Nolan Bushnell, creator of Atari and 'Pong' has come up with TeamNet and TouchN", The San Francisco Chronicle, Aug. 23, 1996, Section: Daily Datebook, p. D1. (4 pages).*

Miller, Donald, "Terminal is set up for public use", Santa Cruz Sentinel, Sep. 29, 1996, Section: p. D1. (3 pages).

Denton, Nicholas, "British Telcom launches public online booths", The Financial Post, Oct. 29, 1996, Section: Section 1, News, p. 10. (1 page).

"Internet pub scorns the café 'anoraks'", The Herald, Dec. 2, 1996, Section: p. 4. (1 page).

Bueschel, Richard, "The Encyclopedia of Pinball vol. 1", Jan. 1997. (1 page).

Price, Stuart, "Connected: Kiosks get off to a slow start Technology BT's touch-screen information points have to clear a cultural hurdle", The Daily Telegraph, Feb. 4, 1997, Section p. 06. (2 pages).

Website: "Net Access Inc. Home Page", (httpwww.netaccessinc.com/index.htm), download date: Feb. 27, 1997. (1 page).

Website: "The Public Access Coin Operated internet Browser", (http://embed.com:80/coinet.htm), download date: Feb. 27, 1997. (4 pages).

"The Internet Goes Mainstream", RePlay Magazine, Mar. 1997, pp. 179-183. (5 pages).

Office Action for U.S. Appl. No. 11/425,413 dated Dec. 11, 2007. (13 pages).

Office Action for U.S. Appl. No. 11/425,413 dated May 14, 2008. (8 pages).

Office Action for U.S. Appl. No. 11/425,413 dated Sep. 22, 2008. (7 pages).

* cited by examiner

— 210'

| RANDOM NUMBER 404 | AUDIO/VIDEO OUTPUT 406 | GAME RESULT 408 | OUTCOME VALUE 410 |
|---|---|---|---|
| 00001 | [HOLE_IN_ONE.MPG2] | WIN | 100 |
| 00002 | [MISSED_PUTT_1.MPG2] | LOSS | 0 |
| 00003 | [CHIP_FOR_BIRDIE.MPG] | WIN | 2 |
| 00004 | [ERRANT_SHOT_1.MPG] | LOSS | 0 |
| 00005 | [WATER_HAZARD_2.MPG] | LOSS | 0 |
| 00006 | [SAND_SAVE_1.MPG] | WIN | 2 |
| ⋮ | ⋮ | ⋮ | ⋮ |
| 00112 | [GREG_AMY_WEDDING.MOV] | WIN | 50 |
| 00113 | [STRANGER_AT_DOOR.MOV] | LOSS | 0 |
| 00114 | [DOCTOR_HAS_GOOD_NEWS.MOV] | WIN | 2 |
| 00115 | [BREAKFAST_ALONE.MOV] | LOSS | 0 |
| 00116 | [BREAK_UP_1.MOV] | LOSS | 0 |
| 00117 | [FIRST_KISS_1.MOV] | WIN | 14 |
| ⋮ | ⋮ | ⋮ | ⋮ |
| 03456 | [NYY_GAMEWINNING_HOMER_1.MPG] | WIN | 20 |
| 03457 | [NYY_6_4_3_DBLPLAY_7.MPG] | WIN | 2 |
| 03458 | [NYY_THROWING_ERROR_1.MPG] | LOSS | 0 |
| 03459 | [NYY_POPUP_TO_RIGHT_10.MPG] | LOSS | 0 |
| ⋮ | ⋮ | ⋮ | ⋮ |
| 10647 | [10TH_FRAME_PERFECT_GAME.MPG] | WIN | 20 |
| 10648 | [7_10_SPLIT_SPARE_1.MPG] | WIN | 10 |

| | PLAYER IDENTIFIER 812 | GAMING DEVICE IDENTIFIER 814 | SESSION START DATE/TIME 816 | NUMBER OF HANDLE PULLS 818 | OUTPUT AUDIO/VIDEO 1 820a | ... | OUTPUT AUDIO/VIDEO N 820n |
|---|---|---|---|---|---|---|---|
| 802 → | P 161 | M 601 | 01/01/05 13:55 | 86 | [DESCRIPTOR 1] | | [DESCRIPTOR N] |
| 804 → | P 802 | M 176 | 01/01/05 14:08 | 73 | [DESCRIPTOR A] | | [DESCRIPTOR B] |
| 806 → | P 693 | M 738 | 01/01/05 14:16 | 65 | [DESCRIPTOR X] | ... | [DESCRIPTOR Y] |
| 808 → | P 864 | M 389 | 01/01/05 14:22 | 59 | [DESCRIPTOR S] | | [DESCRIPTOR T] |
| 810 → | P 895 | M 529 | 01/01/05 14:31 | 51 | [DESCRIPTOR L] | | [DESCRIPTOR M] |

GAMING DEVICE METHODS AND APPARATUS EMPLOYING AUDIO/VIDEO PROGRAMMING OUTCOME PRESENTATION

The present application claims the benefit of U.S. Provisional Application Ser. No. 60/581,558, filed on Jun. 21, 2004 in the name of Walker et al.

The present application is also a continuation-in-part of U.S. patent application Ser. No. 10/417,758, filed Apr. 16, 2003 in the name of Walker et al. and entitled titled "Gaming Device Methods and Apparatus Employing Audio/Video Programming Outcome Presentation."

Each of the above applications is incorporated by reference herein in its entirety, for all purposes.

BACKGROUND OF THE INVENTION

Within the casino gaming industry, slot machines typically generate most of the profits realized by casino owners and operators. For this reason, numerous slot machine types and formats have been developed and are employed within casinos (e.g., slot machines having a variety of display formats for the reels or other game features of the slot machines, larger jackpots, etc.). By providing a large variety of slot machines, casino owners and operators may appeal to a larger audience, and acquire and retain slot machine players.

Despite the variety of available options, conventional slot machines may still lack sufficient entertainment value to attract and retain slot machine players. Specifically, many people view all or a portion of slot machine play primarily as a passive, relatively boring experience. Accordingly, a need exists for improved slot machines that provide a more interactive and/or exciting gaming experience.

SUMMARY OF THE INVENTION

In a first aspect of the invention, a first method of operating a gaming device is provided. The first method includes the steps of (1) determining an outcome value of a game result of the gaming device; (2) retrieving historical audio/video programming having content that provides an indication of the outcome value; and (3) providing the historical audio/video programming to a player of the gaming device. The historical audio/video programming may comprise, for example, a television show, a sporting event, a movie, an animated show, or the like.

In a second aspect of the invention, a second method of operating a gaming device is provided. The second method is similar to the first method, but includes the step of receiving a selection of a classification of audio/video programming for a player of the gaming device. That is, the player of the gaming device may influence the selection of audio/video programming to be provided to the player. Exemplary classifications of audio/video programming may include, for example, audio/video programming that relates to a particular sporting event (or type of sporting event), team (or type of team), athlete, actor or actress, performance, etc.

In a third aspect of the invention, a method for use with a gaming device is provided. The method includes the steps of (1) receiving historical audio/video programming; (2) examining content of the historical audio/video programming; (3) determining an outcome value of a game result of the gaming device that is indicatable by the content of the audio/video programming; and (4) associating the historical audio/video programming with the outcome value. One or more of the above methods may be performed, for example, by a controller and/or a gaming device.

Numerous other aspects of the invention are provided, as are systems, apparatus, computer program products and/or data structures in accordance with these and other aspects of the invention. Each computer program product described herein may be carried by a medium readable by a computer (e.g., a carrier wave signal, a floppy disc, a hard drive, a random access memory, etc.).

In another aspect of the invention, a gaming device control system is provided. The gaming device control system includes means for receiving a game initiation signal, and means for initiating game play at a gaming device in response to the game initiation signal. The gaming device control system further includes means for determining a game result of the game play initiated at the gaming device and means for determining an outcome value of the game result.

The gaming device control system also includes means for selecting historical audio/video programming having content that provides an indication of the outcome value and means for providing the historical audio/video programming to a player of the gaming device. Further, the gaming device control system includes means for at least arranging for payment to the player based on the outcome value (e.g. if the game result is a winning game result).

With these and other advantages and features of the invention that will become hereinafter apparent, the nature of the invention may be more clearly understood by reference to the following detailed description of the invention, to the appended claims and to the several drawings attached herein.

BRIEF DESCRIPTION OF THE DRAWINGS

FIG. 4A illustrates a sample of the contents of a first exemplary outcome database of FIG. 2 or 3.

FIG. 8 illustrates a sample of the contents of the session status database of the controller of FIG. 2.

DETAILED DESCRIPTION

Figure 1:
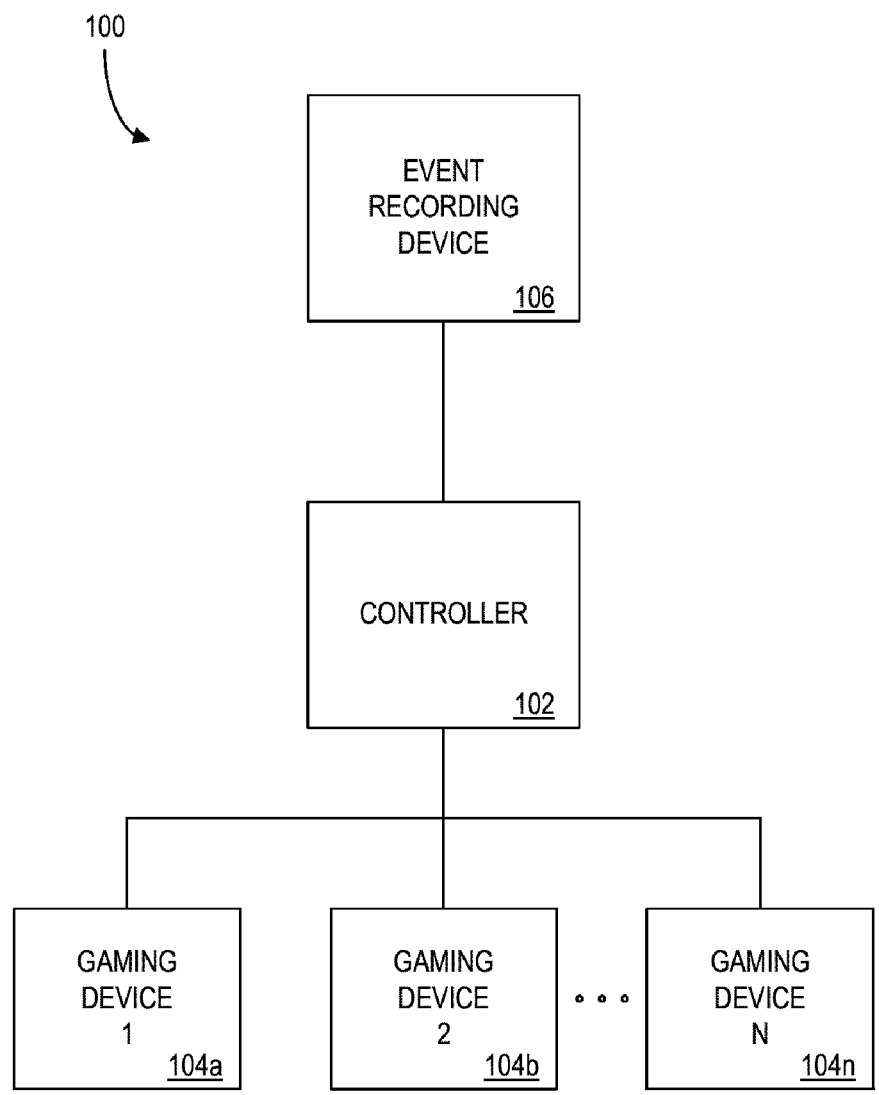
FIG. 1 is a schematic diagram of an exemplary gaming device control system provided in accordance with the present invention.

In one or more embodiments of the invention, historical audio/video programming may be provided to a player of a gaming device. More specifically, historical audio/video programming may be provided to the player during game play so as to indicate an outcome value the player will receive as a result of the game play. For example, in one embodiment of the invention, a player may provide a wager and subsequently pull a handle or actuate a button of a gaming device to initiate game play at the gaming device. Thereafter, the gaming device may determine a game result for the game play (e.g., win or lose) and an accompanying outcome value for the game play (e.g., no payment, a nominal payment, a large payment, etc.). In place of a conventional (e.g. reel-based) display that indicates an outcome value of the game play, the present invention may retrieve historical audio/video programming that provides an indication of the outcome value, and provide the historical audio/video programming to the player.

The historical audio/video programming may comprise, for example, an audio/video clip, a scene from a television show, movie, or animated show (e.g., a cartoon or animated motion picture), a concert performance, a sporting event, etc., having a quality of performance, conveying a level of achievement and/or a historical significance that is commensurate with, proportionate to or otherwise indicative of the outcome value of the game result. For instance, audio/video programming that depicts a kick-off return during a football game may be employed to indicate an outcome value of a game result of a gaming device. If a player of a gaming device achieves a jackpot as an outcome value of game play, a gaming device may provide historical audio/video programming depicting e.g. a 105-yard kick-off return for a touchdown. Likewise, if the player achieves a no payment outcome value, the gaming device may provide historical audio/video programming depicting a fair catch, a fumble, a touchback, etc. An intermediate distance kick-off return may indicate an intermediate outcome value. In each case, an increased level of player excitement and anticipation may be generated while the gaming device player watches a kick-off and attempted kick-off return during game play.

Other historical audio/video programming may be similarly employed (e.g., sporting events, acting performances, etc.), as described further below. Such historical audio/video programming presentation may occur before, during or after the game result and/or outcome value of game play is provided (or otherwise indicated) to a gaming device player.

By providing historical audio/video programming to a player of a gaming device so as to indicate an outcome value of a game result of the gaming device, numerous advantages are realized. When contrasted with conventional game play, such a gaming experience tends to be more exciting, interactive, and in some cases more spontaneous. For example, in one or more embodiments of the invention, a player may be unaware of the outcome value and/or game result of game play while the historical audio/video programming is being provided. However, by viewing the historical audio/video programming to obtain an indication of the outcome value and/or game result, a high level of excitement may result (e.g., as the player watches to see how far a kick-off is returned, whether a golfer makes a putt, whether a baseball player hits a home run or strikes out, whether an actress in a soap opera accepts or rejects a marriage proposal, etc.). Further, in one or more embodiments of the invention, a player of a gaming device may specify a classification of audio/video programming that will be employed to provide indications of outcome values during game play (e.g., audio/video programming that relates to a particular sporting event or type of sporting event, team, athlete, actor or actress, etc.). For example, a gaming device player may elect to have outcome values and/or game results conveyed to him in the form of sporting highlights from a particular team from a particular era (e.g. 1940's New York Yankees highlights). Game play thereby may be more personalized and/or satisfying. Accordingly, gaming devices that operate in accordance with the present invention may increase player satisfaction, attract a larger pool of gaming device players and increase the amount of time and/or money people are willing to spend at a gaming device. Casino profitability may thereby increase.

These and other aspects of the invention are described further below with reference to FIGS. 1-8.

Relevant Terminology

As used herein, a "gaming device" refers to a device operative to: accept monetary wagers as consideration for the presentation of a game result, the presentation of the game result being in the form of historical audio and/or video programming; determine a random number, game result and/or outcome value; based on the determined random number, game result and/or outcome value, present historical audio and/or video programming to a gaming device player, wherein the presented audio and/or video programming is indicative of the determined random number, outcome value and/or game result; and provide a monetary award to the gaming device player if the game result is a winning game result.

As used herein, "historical audio/video programming" refers to audio and/or video programming such as one or more of an audio/video clip, a scene from a television show movie, or animated show (e.g., a cartoon or animated motion picture), one or more play(s) from a sporting event (e.g. a professional golfer executing a shot), an episode of a television show, etc. Historical audio/video programming may be pre-recorded audio/video programming and may convey to a gaming device player one or more of: a level of achievement or historical significance associated with the historical audio/video programming. As used herein, historical audio/video programming does not include the presentation of discreet slot machine reel positions, symbols or paylines, representations of playing cards, roulette wheels or keno elements. Rather, it is a distinct feature of the present invention that a gaming device outcome value may be conveyed to a gaming device player via the utilization of historical audio/video such as audio/video conveying one or more elements of e.g. a human performance (e.g. an athlete executing a play, an actor or actress reciting a line, performing within a certain context, portraying a particular type of scene or character etc.). Further, in accordance with the present invention, historical audio/video programming to be presented to a gaming device player may be determined via an independent and random process and not on the basis of a traditional reel-based gaming device outcome.

Exemplary Embodiments of Gaming Device Control System

FIG. 1 is a schematic diagram of an exemplary gaming device control system 100 provided in accordance with the present invention. The gaming device control system 100 includes a controller 102 in communication with a plurality of gaming devices 104*a-n* and an event recording device 106. Although three gaming devices 104*a-n* are shown in FIG. 1, it will be understood that fewer or more than three gaming devices may be in communication with the controller 102. Further, the controller 102 may comprise one or more controllers, and more than one event recording device 106 may be employed. Exemplary embodiments of the controller 102 are described below with reference to FIG. 2. Exemplary embodiments of the gaming devices 104*a-n* are described below with reference to FIG. 3.

The gaming devices 104*a-n* may be in communication with the controller 102 via any conventional communications medium and/or protocol. For example, the gaming devices 104*a*-*n* may communicate with the controller 102 via a WEB-based connection, a local area network (LAN), a wide area network (WAN), the Internet, other forms of internet protocol (IP) networks (e.g., intranets or extranets), a publicly switched telephone network (PSTN), a wireless communications network or any other known communications system/medium. Those skilled in the art will understand that devices in communication with each other need only be "capable of" communicating with each other and need not be continually transmitting data to or receiving data from each other. On the contrary, such devices need only transmit data to or receive data from each other as necessary, and may actually refrain from exchanging data most of the time. For example, a device in communication with another device via the Internet may not transmit data to the other device or receive data from the other device for weeks at a time. Further, devices may be in communication even though steps may be required to establish a communication link (e.g., dialing a network service provider).

A variety of communications protocols may be part of the system 100, including but not limited to: Ethernet (or IEEE 802.3), SAP, SAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

The event recording device 106 may comprise, for example, a television camera or camcorder, a video cassette recorder (VCR), a Digital Versatile Disk (or Digital Video Disk) (DVD) recorder, a television recorder having data storage capability (e.g., TiVo® manufactured by Phillips™), a personal computer, a combination thereof, or any similar device capable of recording audio/video programming and/or providing audio/video programming to the controller 102. As with the gaming devices 104*a*-*n*, the event recording device 106 may be in communication with the controller 102 via any conventional communications medium and/or protocol (as described above).

As will be described further below, in one or more embodiments of the invention, the controller 102 may be adapted to receive historical audio/video programming (e.g., from a casino owner or operator, gaming device manufacturer, or other controller operator, the player of a gaming device, etc., such as via the event recording device 106 or some other source), and provide the historical audio/video programming to one or more of the gaming devices 104*a*-*n*. The historical audio/video programming then may be employed by the one or more gaming devices 104*a*-*n* during game play to indicate an outcome value of a game result of the game play. For example, the historical audio/video programming may comprise one or more of a television show, a movie, an animated show (e.g., a cartoon or animated motion picture), a concert performance, a sporting event, etc. The historical audio/video programming may convey a quality of performance, a level of achievement and/or a historical significance that is commensurate with, proportionate to or otherwise indicative of the outcome value of the game result of the game play. In certain embodiments, the historical audio/video programming may be stored by one or more of the gaming devices 104*a*-*n* or provided directly to a gaming device player.

In other embodiments of the invention, all or a portion of the functions performed by the controller 102 may be performed by the gaming devices 104*a*-*n*. For example, each gaming device 104*a*-*n* may store historical audio/video programming locally (e.g., at the gaming device 104*a*-*n*), and/or receive historical audio/video programming directly from the event recording device 106. In one particular embodiment, all or a part of historical audio/video programming may be stored in a local memory of a gaming device (e.g., in a suitable format such as MPEG2 as described below). Such audio/video programming may be provided, for example, from an optical or magnetic storage media and periodically updated/loaded as required.

Whether stored locally or provided from a remote location, each gaming device 104*a*-*n* may be adapted to output historical audio/video programming to a player of the respective gaming device 104*a*-*n* so as to indicate an outcome value of a game result of game play at the respective gaming device 104*a*-*n*.

Exemplary Embodiments of the Controller

Figure 2:
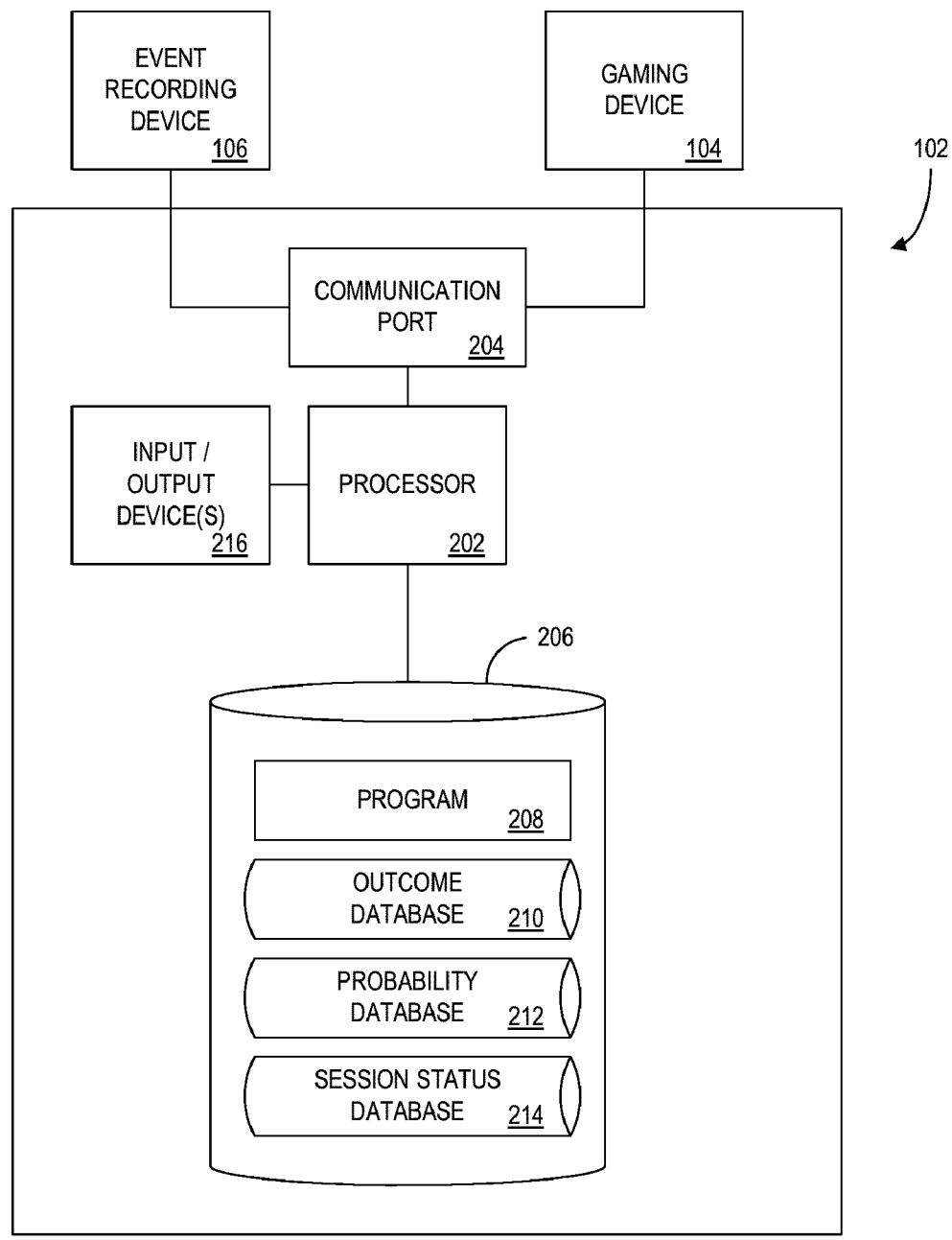
FIG. 2 is a schematic diagram of an exemplary embodiment of a controller of FIG. 1.

FIG. 2 is a schematic diagram of an exemplary embodiment of the controller 102 of FIG. 1 (shown coupled to one of the gaming devices 104*a*-*n*, referred to as gaming device 104 in FIG. 2, and the event recording device 106). The controller 102 may be implemented as a system controller, as a dedicated hardware circuit, as an appropriately programmed general purpose computer, or as any other equivalent electronic, mechanical or electro-mechanical device.

With reference to FIG. 2, the controller 102 comprises a processor 202, such as one or more conventional microprocessors (e.g., one or more Intel® Pentium® processors). The processor 202 is in communication with a communication port 204 through which the processor 202 communicates with other devices (e.g., with the gaming devices 104*a*-*n*, the event recording device 106 or other gaming devices or event recording devices not shown). The communication port 204 may include multiple communication channels for simultaneous communication with, for example, the gaming devices 104*a*-*n*, the event recording device 106 and/or other gaming or event recording devices (not shown). As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 202 also is in communication with a data storage device 206. The data storage device 206 may comprise an appropriate combination of magnetic, optical and/or semiconductor memory, and may include, for example, Random Access Memory (RAM), Read-Only Memory (ROM), a compact disc and/or a hard disk. The processor 202 and the data storage device 206 each may be, for example, located entirely within a single computer or other computing device; or connected to each other by a communication medium, such as a serial port cable, a telephone line or a radio frequency transceiver. Alternatively, the controller 102 may comprise one or more computers that are connected to a remote server computer (not shown) for maintaining databases.

The data storage device 206 may store, for example, (i) a program 208 (e.g., computer program code and/or a computer program product) adapted to direct the processor 202 in accordance with the present invention, and particularly in accordance with the processes described in detail hereinafter with regard to the controller 102; (ii) an outcome database 210 adapted to store information that may be utilized to determine a game result (e.g., win/lose, pay 5 credits, deduct 5 credits, etc.), an associated outcome value and/or associated audio/video programming for one or more of the gaming devices 104*a*-*n*; (iii) a probability database 212 adapted to store information that may be utilized to establish frequencies with which various outcome values will occur at one or more of the gaming devices 104*a*-*n*; and (iv) a session status database 214 adapted to store information that may be employed to determine whether certain historical audio/video programming may be provided to a player of a gaming device 104*a*-*n* during game play at the gaming device 104*a*-*n*. Exemplary embodiments of the databases 210-214 are described below with reference to FIGS. 4A-5 and FIG. 8.

The program 208 may be stored, for example, in a compressed, an uncompiled and/or an encrypted format, and may include computer program code that allows the controller 102 to employ the communication port 204 to:

1. determine an outcome value of a game result at one of the gaming devices 104*a*-*n* (e.g., by receiving a random number from one of the gaming devices 104*a*-*n* and determining the outcome value based on the random number, by receiving the outcome value directly from one of the gaming devices, etc.);
2. retrieve historical audio/video programming having content that provides an indication of the outcome value of the game result; and/or
3. provide the historical audio/video programming to a player of the gaming device (e.g., by providing the historical audio/video programming to one of the gaming devices 104*a*-*n* or directly to the player).

Suitable computer program code may be provided for performing numerous other functions such as receiving historical audio/video programming, analyzing content of historical audio/video programming, determining an outcome value of a game result of a gaming device that is indicatable by the content of the audio/video programming, storing the outcome value such that the outcome value is correlated to at least a pointer to the historical audio/video programming, receiving payment in exchange for game play and/or the provision of historical audio/video programming, providing a payout if a player wins, receiving a selection of a classification of historical audio/video programming from a player of one of the gaming devices 104*a*-*n*, providing historical audio/video programming that is included within the selected classification to the player, etc. The computer program code required to implement the above functions (and the other functions described herein) can be developed by a person of ordinary skill in the art, and is not described in detail herein.

The controller 102 may include any peripheral devices (e.g., microphones, speakers, a keyboard, a computer display, a touch screen, LCD, voice recognition software, an optical or magnetic read head, etc., generally represented by input/output devices 216 in FIG. 2) required to implement the above functionality. The program 208 also may include program elements such as an operating system, a database management system and "device drivers" that allow the processor 202 to interface with computer peripheral devices (e.g., a video display, a keyboard, a computer mouse, etc.).

Note that instructions of the program 208 may be read into a main memory (not shown) of the processor 202 from a computer-readable medium other than the data storage device 206, such as from a ROM or from a RAM. While execution of sequences of instructions in the program 208 causes the processor 202 to perform the process steps described herein, hard-wired circuitry may be used in place of, or in combination with, software instructions for implementation of the processes of the present invention. Thus, embodiments of the present invention are not limited to any specific combination of hardware and software.

The processor 202 also may be in communication with a clock (not shown) that supplies time and date information to the processor 202 and that may comprise, for example, a clock internal to the processor 202, a clock external to the processor 202 or a clock embodied within the program 208 (e.g., based on a system clock not shown).

Exemplary Embodiments of the Gaming Devices

Figure 3:
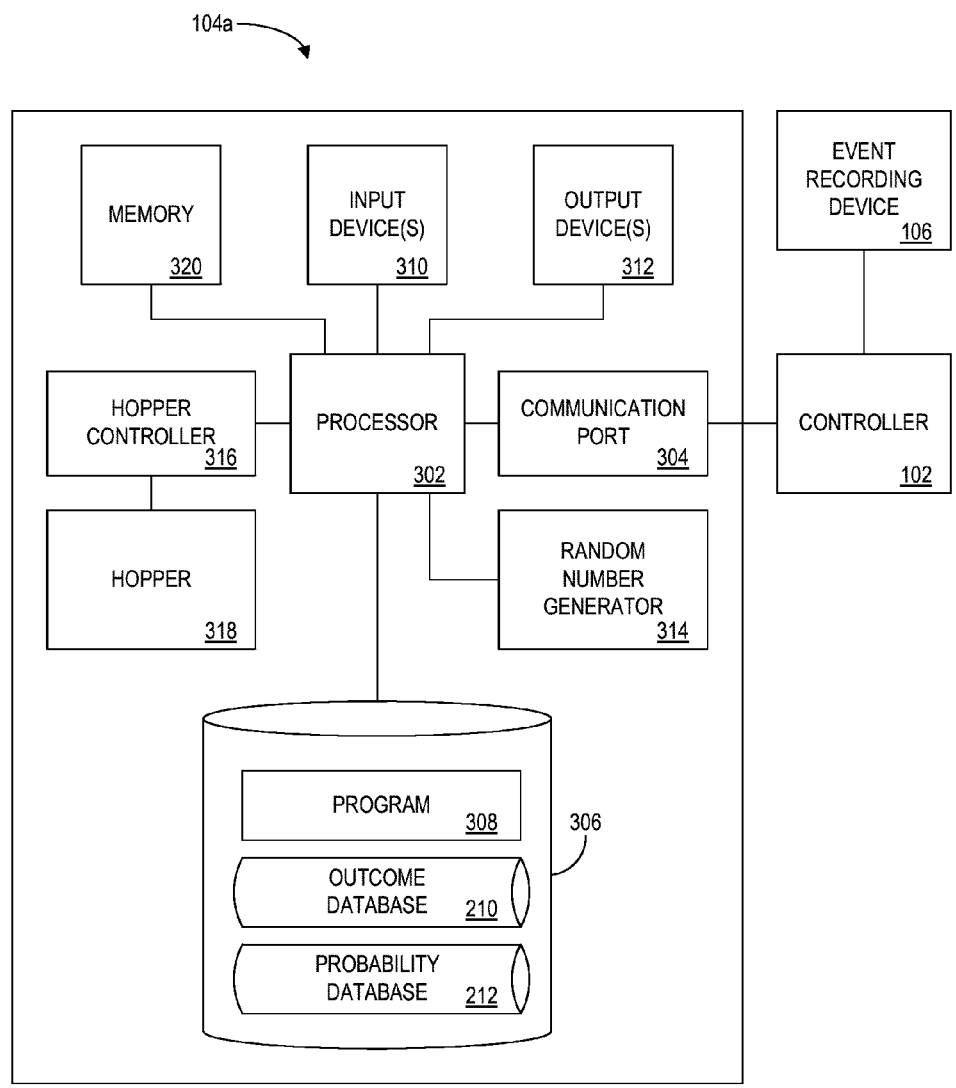
FIG. 3 is a schematic diagram of an exemplary embodiment of a gaming device of FIG. 1.

FIG. 3 is a schematic diagram of an exemplary embodiment of the gaming device 104*a* of FIG. 1 (shown coupled to the controller 102, which is in turn shown coupled to the event recording device 106). The gaming devices 104*b*-*n* may be similarly configured. As stated, each gaming device 104*a*-*n* may comprise a device operative to: accept monetary wagers as consideration for the presentation of a game result, the presentation of the game result being in the form of historical audio and/or video programming; determine a random number, game result and/or outcome value; based on the determined random number, game result and/or outcome value, present historical audio and/or video programming to a gaming device player, wherein the presented audio and/or video programming is indicative of the determined random number, outcome value and/or game result; and provide a monetary award to the gaming device player if the game result is a winning game result.

Any and all of the gaming devices 104*a*-*n* may be implemented as a system controller, a dedicated hardware circuit, an appropriately programmed general-purpose computer, or any other equivalent electronic, mechanical or electro-mechanical device. A gaming device may comprise, for example, a slot machine, a video poker machine, a video blackjack machine, a video keno machine, a video lottery machine, a pachinko machine or a table-top game adapted to output results of game plays via historical audio/video content, as described herein. In various embodiments, a gaming device may comprise, for example, a personal computer (e.g., which communicates with an online casino Web site), a telephone (e.g., to communicate with an automated sports book that provides gaming services), or a portable handheld gaming device (e.g., a PDA). A gaming device may comprise any or all of the gaming devices of the aforementioned systems. In some embodiments, a user device such as a PDA or cell phone may be used in place of, or in addition to, some or all of the gaming device components. Further, a gaming device may comprise a personal computer or other device operable to communicate with an online casino and facilitate game play at the online casino. In one or more embodiments, the gaming device may comprise a computing device operable to execute software in accordance with one or more embodiments described herein.

With reference to FIG. 3, the gaming device 104*a* comprises a processor 302, such as one or more conventional microprocessors (e.g., one or more Intel® Pentium® processors). The processor 302 is in communication with a communication port 304 through which the processor 302 communicates with other devices (e.g., with the controller 102, with the event recording device 106 or with other devices not shown). The communication port 304 may include multiple communication channels for simultaneous communication with multiple devices. As stated, devices in communication with each other need not be continually transmitting to each other. On the contrary, such devices need only transmit to each other as necessary, may actually refrain from exchanging data most of the time, and may require several steps to be performed to establish a communication link between the devices.

The processor 302 also is in communication with a data storage device 306. The data storage device 306 may comprise an appropriate combination of magnetic, optical and/or semiconductor memory, and may include, for example, Random Access Memory (RAM), Read-Only Memory (ROM), a compact disc and/or a hard disk. The processor 302 and the data storage device 306 each may be, for example, located entirely within a single computer or other computing device; or connected to each other by a communication medium, such as a serial port cable, a telephone line or a radio frequency transceiver. Alternatively, the gaming device 104*a* may comprise one or more computers that are connected to a remote server computer (not shown) for maintaining databases.

The data storage device 306 may store, for example, a program 308 (e.g., computer program code and/or a computer program product) adapted to direct the processor 302 in accordance with the present invention, and particularly in accordance with the processes described in detail hereinafter with regard to the gaming devices 104*a-n*. In one or more embodiments wherein all or part of the functionality of the controller 102 (FIG. 2) is implemented by the gaming device 104*a*, the gaming device 104*a* may include one or more databases similar to the databases 210-214 described previously with reference to FIG. 2. For convenience, the same reference numerals for these databases are employed in FIGS. 2 and 3. Specifically, the data storage device 306 may store (i) the outcome database 210 adapted to store information that may be utilized to determine a game result (e.g., win/lose, etc.), an associated outcome value and/or associated audio/video programming for the gaming device 104*a*; and (ii) the probability database 212 adapted to store information that may be used to establish frequencies with which various outcome values will occur at the gaming device 104*a*. Though not shown in FIG. 3, the data storage device 306 also may include the session status database 214 adapted to store information that may be employed to determine whether certain historical audio/video programming may be provided to a player of the gaming device 104*a* during game play at the gaming device 104*a*. Note that when the session status database 214 is employed by a gaming device 104*a-n*, the session status database 214 typically will contain information relating only to the respective gaming device 104*a-n* (unlike the session status database 214 described below with reference to FIG. 8 which contains information relating to several gaming devices).

One or more of the databases 210-214 may be eliminated if the corresponding functionality is provided by the controller 102. Exemplary embodiments of the databases 210-214 are described below with reference to FIGS. 4B-5 and 8.

Additionally, where appropriate, a player database (not shown) may be utilized to store historical data associated with specific players. A player database may be used, for example, to store player wager data so that players wagering over a given threshold in a given amount of time may be rewarded for their patronage. The player database may also contain other information that may be useful in, for example, promoting and managing player behaviors (e.g., information about the players gaming preferences, outstanding debts, lodging arrangements, and the like). Further, the player database may store data regarding a given player's standing in a game session or bonus game, so that the player can continue the game session or bonus game at a plurality of game machines that have common access to the player database. Such player data may be stored in a relational database and retrieved or otherwise accessed by the processor after receiving a "key" data point from the player, such as a unique identifier read from the player's player tracking card or cashless gaming ticket.

Note that, although the databases 210-214 are described as being stored in a gaming device, in other embodiments of the present invention some or all of these databases may be partially or wholly stored in another device, such as one or more of peripheral devices, a peripheral device server, central server, kiosks, casino personnel devices, merchant POS terminals, and so on. Further, some or all of the data described as being stored in the databases may be partially or wholly stored (in addition to or in lieu of being stored in the memory of the gaming device) in a memory of one or more other devices, such as one or more of the peripheral devices, another gaming device, the peripheral device server and/or the server.

The program 308 may be stored, for example, in a compressed, an uncompiled and/or an encrypted format, and may include computer program code that allows the gaming device 104*a* to:

1. determine an outcome value of a game result at the gaming device 104*a* (e.g., based on a random number generated by the gaming device 104*a*);
2. retrieve historical audio/video programming having content that provides an indication of the outcome value of the game result; and/or
3. provide the historical audio/video programming to a player of the gaming device 104*a*.

Suitable computer program code may be provided for performing numerous other functions such as receiving historical audio/video programming, analyzing content of historical audio/video programming, determining an outcome value of a game result of the gaming device that is indicatable by the content of the audio/video programming, storing the outcome value such that the outcome value is correlated to at least a pointer to the historical audio/video programming, receiving payment in exchange for game play and/or the provision of historical audio/video programming, providing a payout if a player wins, receiving a selection of a classification of historical audio/video programming from a player of the gaming device, providing historical audio/video programming that is included within the selected classification to the player, etc.

The computer program code required to implement the above functions (and the other functions described herein) can be developed by a person of ordinary skill in the art, and is not described in detail herein. The program 308 also may include program elements such as an operating system, a database management system and "device drivers" that allow the processor 302 to interface with computer peripheral devices (e.g., a video display, a keyboard, a computer mouse, etc.).

Note that instructions of the program 308 may be read into a main memory (not shown) of the processor 302 from a computer-readable medium other than the data storage device 306, such as from a ROM or from a RAM. While execution of sequences of instructions in the program 308 causes the processor 302 to perform the process steps described herein, hard-wired circuitry may be used in place of, or in combination with, software instructions for implementation of the processes of the present invention. Thus, embodiments of the present invention are not limited to any specific combination of hardware and software.

The term "computer-readable medium" as used herein refers to any medium that participates in providing instructions to the processor of the gaming device (or any other processor of a device described herein) for execution. Such a medium may take many forms, including but not limited to, non-volatile media, volatile media, and transmission media. Non-volatile media include, for example, optical or magnetic disks, such as memory. Volatile media include dynamic random access memory (DRAM), which typically constitutes the main memory. Transmission media include coaxial cables, copper wire and fiber optics, including the wires that comprise a system bus coupled to the processor. Transmission media may carry acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, a carrier wave as described hereinafter, or any other medium from which a computer can read.

Various forms of computer readable media may be involved in carrying one or more sequences of one or more instructions to the processor 302 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device (or, e.g., a server) can receive the data on the telephone line and use an infrared transmitter to convert the data to an infrared signal. An infrared detector can receive the data carried in the infrared signal and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of carrier waves that carry data streams representing various types of information. Thus, the gaming device may obtain instructions in the form of a carrier wave.

According to an embodiment of the present invention, the instructions of the program may be read into a main memory from another computer-readable medium, such from a ROM. Execution of sequences of the instructions in program causes processor perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to aforementioned systems, execution of sequences of the instructions in a program of a peripheral device in communication with the gaming device may also cause the processor to perform some of the process steps described herein.

The processor 302 also may be in communication with a clock (not shown) that supplies time and date information to the processor 302 and that may comprise, for example, a clock internal to the processor 302, a clock external to the processor 302 or a clock embodied within the program 308 (e.g., based on a system clock not shown).

The gaming device 104a may include any additional components required to implement the above functionality. For example, the gaming device 104a may include one or more input devices 310 such as a microphone, a touch screen, a keyboard or keypad, voice recognition software/hardware, an optical or magnetic read head, a card reader, a coin acceptor and/or a paper currency validator, a bar code reader (e.g., for discerning value from "cashless" gaming vouchers), a game play initiator such as a button or handle, a biometric device for determining an identity or age of a player, a credit or debit card authorization terminal, etc.

The gaming device 104a also may include one or more output devices 312 for outputting appropriate audio/video programming and game play results to a player of the gaming device 104a, audio/video programming classification selections, menus, etc. For example, the gaming device 104a may comprise one or more speakers, a cathode ray tube or flat panel display, a projector, LCD, etc. Note that the controller 102 may include similar input or output devices.

In one or more embodiments of the invention, the gaming device 104a also may include a random or pseudo-random number generator 314 that may be utilized by the gaming device 104a and/or the controller 102 for determining a game result (e.g., after game play has been initiated at the gaming device 104a). The random number generator 314 also may be employed to determine a corresponding outcome value/payout (and/or corresponding historical audio/video programming) to be provided to a player of the gaming device 104a as described further below. The random number generator 314 may be embodied in hardware, software or a combination thereof as is known in the art, and may include one or more features that prevent or identify tampering.

Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

Of course, as would be understood by one of ordinary skill in the art, a random number generator may be stored in a device other than a gaming device. For example, in some embodiments, a gaming device may receive random numbers and/or any other data related to the random or pseudo-random determination of an outcome from a separate device, such as a server. It should be noted that such embodiments may be advantageous in environments or jurisdictions wherein the "central determination" of outcomes is required by regulation or otherwise preferred.

To assist in payouts as a result of winning game results at the gaming device 104a, the gaming device 104a may include a hopper controller 316 and a hopper 318. The hopper controller 316 may be configured to instruct the hopper 318 when to dispense payment, and how much payment to dispense, to a player as a result of a winning game result at the gaming device 104*a*. Hoppers and hopper controllers are well known in the casino gaming device arts and will not be described in further detail herein.

Of course, the gaming device 104*a* may include, in addition to or in lieu of the hopper controller 316 and hopper 318, one or more other types of benefit output devices. A benefit output device may comprise one or more devices for outputting a benefit to a player of the gaming device. For example, in one embodiment the gaming device 104*a* may provide coins and/or tokens as a benefit. As described, in such an embodiment the benefit output device may comprise a hopper and hopper controller (e.g., such as hopper 318 and hopper controller 316), for dispensing coins and/or tokens into a coin tray of the gaming device. In another example, the gaming device 104*a* may provide a receipt or other document on which there is printed an indication of one or more benefits (e.g., a cashless gaming ticket as is known in the art). In such an embodiment, the benefit output device may comprise a printing and document dispensing mechanism. In yet another example, the gaming device 104*a* may provide electronic credits as a benefit (which, e.g., may be subsequently converted to coins and/or tokens and dispensed from a hopper into a coin tray). In such an embodiment, the benefit output device may comprise a credit meter balance and/or a processor that manages the amount of electronic credits that is indicated on a display of a credit meter. In yet another example, the gaming device 104*a* may credit a monetary amount to a financial account associated with a player as a benefit provided to a player. The financial account may be, for example, a credit card account, a debit account, a charge account, a checking account, or a casino account (e.g., an account from which the player may access cashable and/or non-cashable funds using a player tracking card or smart card). In such an embodiment the benefit output device may comprise a device for communicating with a server on which the account is maintained. Note that, in one or more embodiments, the gaming device 104*a* may include more than one benefit output device. For example, the gaming device may include both a hopper and hopper controller combination and a credit meter balance. Such a gaming device may be operable to provide more than one type of benefit to a player of the gaming device. A single benefit output device may be operable to output more than one type of benefit. For example, a benefit output device may be operable to increase the balance of credits in a credit meter and communicate with a remote device in order to increase the balance of a financial account associated with a player.

The processor 302 may also be operable to communicate with one or more output devices, as described above. As described, in some embodiments, an output device comprises a display device. The display device may comprise, for example, one or more display screens or areas for outputting information related to game play and/or other information relevant to the gaming device, such as a cathode ray tube (CRT) monitor, liquid crystal display (LCD) screen, or light emitting diode (LED) screen. In one or more embodiments, a gaming device may comprise more than one display device. For example, a gaming device may comprise an LCD display for displaying historical audio/video content. The display device may comprise, for example, one or more display areas. For example, one of the display areas (e.g., a primary game screen) may display outcomes of games played on the gaming device (e.g., electronic reels of a gaming device). Another of the display areas (e.g., a secondary game screen) may display rules for playing a game of the gaming device. Yet another of the display areas may display the benefits obtainable by playing a game of the gaming device (e.g., in the form of a payout table).

The processor may also be in communication with one or more other output devices besides the display device, for outputting information (e.g., to a person or another device). Such other one or more output devices may also be components of a gaming device. Such other one or more output devices may comprise, for example, an audio speaker (e.g., for outputting an outcome or information related thereto, in addition to or in lieu of such information being output via a display device); headphones; an infra-red transmitter; a radio transmitter; an electric motor; a printer (e.g., such as for printing cashless gaming tickets); a dispenser for outputting pre-printed coupons, tickets or vouchers; an infra-red port (e.g., for communicating with a second gaming device or a portable device of a player); one or more universal serial bus (USB) ports; a Braille computer monitor; and a coin or bill dispenser. For gaming devices, common output devices include a cathode ray tube (CRT) monitor on a video poker machine, a bell on a gaming device (e.g., rings when a player wins), an LED display of a players credit balance on a gaming device, an LCD display of a personal digital assistant (PDA) for displaying keno numbers.

The processor 302 may also be in communication with one or more input devices, which may be capable of receiving an input (e.g., from a player or another device) and which may be a component of gaming device. Alternately or additionally, an input device may communicate with or be part of another device (e.g., a server, a gaming device, etc.). Some examples of input devices include: a bar-code scanner, an optical scanner configured to read other indicia of a voucher or cashless gaming ticket, a CCD camera, a magnetic stripe reader (e.g., for reading data encoded upon a player tracking card), a smart card reader (e.g., for reading data stored upon a smart card), a computer keyboard or keypad, a button, a handle, a lever, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or from a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 302 may also be in communication with a payment system, which may be a component of the gaming device. The payment system is a device capable of accepting payment from a player (e.g., a bet or initiation of a balance) and/or providing payment to a player (e.g., a payout). Payment is not limited to money, but may also include other types of consideration, including products, services, and alternate currencies. Exemplary methods of accepting payment by the payment system include (i) receiving hard currency (i.e. coins or bills), and accordingly the payment system may comprise a coin or bill acceptor; (ii) receiving an alternate currency (e.g., a paper cashless gaming ticket, a coupon, a non-negotiable token), and accordingly the payment system may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity (e.g., participating in surveys, monitoring remote images for security purposes, referring friends to the casino).

In some embodiments, a gaming device may comprise components capable of facilitating both input and output functions (i.e., input/output devices). In one example, a touch-sensitive display screen comprises an input/output device (e.g., the device outputs graphics and receives selections from players). In another example, a processor may communicate with a "ticket-in/ticket-out" device configured to dispense and receive cashless gaming tickets as is known in the art. Such a device may also assist in (e.g., provide data so as to facilitate) various accounting functions (e.g., ticket validation and redemption). For example, any or all of a gaming device, kiosk and casino personnel device maintained at a cashier cage may (i) comprise such a benefit input/output device, and/or (ii) communicate with a central server that manages the accounting associated with such ticket-in/ticket-out transactions (e.g., so as to track the issuance, redemption and expiration of such vouchers). One example of such ticket-in/ticket-out technology, the EZ Pay™ system, is manufactured by International Gaming Technology, headquartered in Reno, Nev.

Of course, as would be understood by one of ordinary skill in the art, a gaming device may comprise various combinations of such component devices. For example, in one or more embodiments, the gaming device may include more than one display device, one or more other output devices, several input devices, and so on (e.g., two display screens, two audio speakers, a ticket-in/ticket-out device and several buttons).

As described, in some embodiments, a slot machine may comprise a reader device for reading data from player tracking cards and/or smart cards, such that (i) players may be identified, and (ii) various data associated with players may then be determined (e.g., a number of cashable credits; a number of promotional credits that may not be redeemed for cash; a number of accumulated loyalty points; a number of accumulated game elements such as symbols, cards or hands; etc.). In one example, a card reader device may determine an identifier associated with a player (e.g., by reading a player tracking card comprising an encoded version of the identifier), such that the gaming device may then access data (e.g., of a player database, as described) associated with the player. In another example, a smart card reader device may determine data associated with a player directly by accessing a memory of an inserted smart card.

Thus, as known in the art, "smart cards" may incorporate (i) a memory, and (ii) means for accessing such a memory. For example, in one embodiment, the memory may store data related to aspects of the present invention. In one embodiment, data may be written to the smart card as a player plays one or more gaming devices (e.g., such that various data may be updated on a continuous, periodic or event-triggered basis). Accordingly, in one or more embodiments one or more devices operable to carry out various processes of the present invention (e.g., a gaming device or kiosk) may have associated therewith a smart card reader device, such that data may be read from the smart card pursuant to the execution of such processes. An example of a smart card system that may be used to implement one or more embodiments of the present invention is the s-Choice™ Smart Card Casino Management System from Smart Card Integrators, Inc.™.

Further, as known in the art, a gaming device may comprise a player tracking module comprising (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT or the iVIEW display screen manufactured by Bally® Gaming and Systems.

Of course, other non-card-based methods of identifying players are contemplated. For example, a unique identification code may be associated with the player. The player may then be identified upon entering the code. For example, the code may be stored (e.g., within a database maintained within the gaming device and/or a server) such that the player may enter the code using an input device of a gaming device, and accordingly be identified. In other embodiments, player biometrics may serve as identification means (e.g., a player is identified via a thumbprint or retinal scan). In further embodiments, a barcode of a cashless gaming ticket may encode a player identifier.

Thus, as described, various data associated with a player may be tracked and stored (e.g., in an appropriate record of a centrally-maintained database), such that it may be accessed as desired (e.g., when determining promotional offers or rewards to be provided to players, when determining the status of player with respect to a particular game or period of gambling activity, and so on). Further, various statistics may be measured in association with a player (e.g., coin-in statistics, win/loss statistics) and similarly accessed.

Various systems for facilitating such monitoring are contemplated. For example, a two-wire system such as one offered by International Gaming Systems (IGT) may be used. Similarly, a protocol such as the IGT SAS™ protocol may be used. The SAS™ protocol allows for communication between gaming machines and slot accounting systems and provides a secure method of communicating all necessary data supplied by the gaming device to the online monitoring system. One aspect of the SAS™ protocol that may be beneficial in implementing aspects of the present invention is the authentication function which allows operators and regulators to remotely interrogate gaming devices for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors slot machines and customer gaming activity. Thus, for example, any one of these systems may be used to monitor a player's gaming activity in order to determine player outcomes, coin-in statistics, win/loss statistics and/or any other data deemed relevant.

In one or more embodiments of the invention, an additional memory or data storage unit 320 may be provided, for example, to serve as an intermediate storage location for audio/video programming being provided to the gaming device 104*a* from a remote source (e.g., the controller 102, the event recording device 106 or another location). As stated, the gaming devices 104*b-n* may be configured similarly to the gaming device 104*a* of FIG. 3.

In some embodiments, the system 100 may include devices in addition to those described with respect to FIG. 1. For example, the system 100 may include one or more kiosks and/or one or more casino personnel devices.

A kiosk may be a device configured to execute or assist in the execution of various processes of the present invention. In some embodiments, a kiosk may comprise a processor and a memory as described. A kiosk may also comprise various input devices (e.g., a keypad, a keyboard, a mouse, buttons, a port that receives player tracking cards, an optical scanner for reading barcodes or other indicia, a CCD camera, etc.), output devices (e.g., a display screen, audio speakers, etc.), benefit output devices (e.g., a coin tray or printer for printing cashless gaming tickets), combinations thereof (e.g., a "ticket-in/ticket-out" device, a touch-sensitive display screen, etc.), communications ports, and so on. Thus, a kiosk may comprise many of the features and components of a gaming device, though the kiosk itself may not necessarily be configured to enable gambling activity as a primary function. A kiosk may communicate with any or all of (i) a central controller, (ii) a gaming device, (iii) an inventory/reservation system of a casino-maintained property (e.g., a hotel), (iv) casino personnel devices, (v) merchant POS terminals, and so on. A number of kiosks may be stationed within casino premises (e.g., at various locations on a slot floor). In various embodiments, kiosks may execute or assist in the execution of (i) determining and outputting a player status or other types of data described herein (e.g., a kiosk receives a player tracking card, and outputs a number of accumulated reward which a player may be entitled to redeem), (ii) outputting payments to players (e.g., upon receipt of cashless gaming tickets, player tracking cards, smart cards, etc.), and/or (iii) any other process described herein. Thus, such a device may be configured to read from and/or write to one or more databases of the present invention. The memory of such a device may store a program for executing such processes.

In some embodiments, various casino employees may be equipped with or otherwise utilize one or more casino personnel devices, such as personal digital assistants (PDAs) or other computing devices (e.g., personal computer terminals). A casino personnel device may comprise various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, a casino personnel device may communicate with a gaming device, server, kiosk, peripheral device, and/or an inventory/reservation system of a casino-maintained property (e.g., a hotel). Thus, a casino personnel device may be configurable to, among other things, (i) read from and/or write to one or more databases of the present invention, (ii) assist in payments made to players (e.g., a representative "scans" a cashless gaming receipt and determines a value associated with the receipt, and if the receipt is valid, provides payment equal to the value), and/or (iii) execute or assist in the execution of various other processes described herein. The memory of such a device may store a program for executing such processes.

In some embodiments, various merchants (e.g., shops, restaurants, etc.) may utilize point-of-sale (POS) computer terminals to facilitate various processes of the present invention. For example, in some embodiments, a player may receive a cashless gaming ticket redeemable for an amount of currency. However, the ticket may alternately or additionally be redeemable for an amount of credit at a particular merchant location. Thus, in some embodiments, merchants may utilize POS terminals to redeem such vouchers. In some embodiments, such devices may be configured to read from and/or write to one or more databases of the present invention. Such POS terminals may thus comprise various hardware and software described herein with respect to other devices, and may communicate with (i) a central slot server, (ii) a gaming device, (iii) an inventory/reservation system (e.g., a computer terminal at a theatre communicates with an inventory database to determine a number of unsold seats for a certain event), (iv) a kiosk, and so on.

In some embodiments of the present invention, various component devices (e.g., any or all of the benefit output devices, output devices, input devices and/or input output devices described herein) may be embodied as peripheral devices. For example, such devices may not necessarily be components of a gaming device, though they may be configured in such a manner so as to communicate with one or more gaming device processors or any other devices described herein. For example, a peripheral device such as a large display device may be associated with a plurality of gaming devices, and thus may not necessarily be considered a component of any one gaming device. Further, in some embodiments, certain peripheral devices such as card readers may be interchangeable between gaming devices, and thus may be considered a component of a first gaming device while connected thereto, removed from the first gaming device, connected to a second gaming device, and so on. In other embodiments, various peripheral devices may never be considered a component of a particular gaming device. For example, in some embodiments, a peripheral device such as a USB-based portable memory device may store (i) one or more databases described herein, and/or (ii) a program for executing one or more process steps described herein. Such a peripheral device may then be utilized by casino personnel for upgrading/retrofitting existing gaming devices as described herein.

In one or more embodiments, aspects of the present invention, such as outputting a value that is a result of a game play at a gaming device via historical audio/video content, may be practiced by replacing and/or augmenting one or more components (e.g., hardware and/or software components) of an existing gaming device. Thus, in one or more embodiments, the invention may be applied as a retrofit or upgrade to existing gaming devices currently available for play within various casinos.

For example, a memory (e.g., computer chip) of the gaming device may be replaced or added, the replacement or additional memory storing a program for instructing the processor of the gaming device to operate in accordance with one or more embodiments of the present invention. In another example, data output via the gaming device (e.g., graphical and/or textual data displayed on the gaming device) may be replaced or added, the replacement or additional data indicating to a player information relevant to one or more aspects of the present invention.

In a specific example, a gaming device may comprise various electronic components mounted to one or more printed circuit boards (PCBs). Such components may include various hardware described herein, such as a communications port and various controllers of peripheral devices (e.g., a display controller), as well as a memory for storing programming instructions (software) and a processor for carrying out such instructions. Forms of memory commonly found gaming devices include electronically erasable programmable read-only memory (EEPROM) and erasable programmable read-only memory (EPROM). Thus, in one or more embodiments of the present invention, an EEPROM storing software with instructions for carrying out aspects of the present invention (as well as instructions for carrying out other functions traditionally performed by the gaming device) may replace an EEPROM previously installed in a gaming device, such that the gaming device may be configured to operate in accordance with various processes of the present invention.

For example, a "historical audio/video content module" may be made available for purchase to various casino operators. The module, which may comprise various hardware and software (e.g., an EEPROM storing software instructions), may be installed in an existing gaming device (e.g., a video-reel slot machine, a video poker machine, etc.), such that when the module is installed, players of the device may elect (i) to play a game offered by the gaming device that does not incorporate aspects of the present invention, or (ii) to play a game offered by the gaming device in a manner that utilizes aspects of the present invention. Thus, players who are familiar with the games offered by various gaming devices may elect to pay for them in a different or similar manner as they are accustomed to.

Accordingly, a gaming device may be configured to allow a player to select one of two "modes" of the gaming device, and to enable the selected mode. If a player selects a "standard" mode, the gaming device may be configured to operate in a manner similar to how it operated before the installation of the module (e.g., the gaming device operates in a conventional manner, such that aspects of the present invention may not be utilized). If a player selects a "historical audio/video content" output mode, the gaming device may then be operable to execute game play in accordance with one or more aspects of the present invention.

In one example of allowing a player to select one or more modes, a touch-sensitive display screen may be configured to output a prompt asking a player to select a mode of operation. Such a prompt may be output in occurrence to various trigger conditions (e.g., coins, bills or tickets are inserted; a credit balance increases from zero to some other number; a player presses a "play" button; a motion, weight, infrared or other sensor detects the presence of a player; etc.). Accordingly, a player may select a mode of operation (e.g., by pressing an appropriately labeled icon of a touch-sensitive display screen), and upon receiving the players selection, the gaming device may be configured to operate in the selected mode.

In other embodiments, as described, a peripheral device may be useful for implementing one or more embodiments of the present invention into the operation of a conventional gaming device. For example, in order to avoid or minimize the necessity of modifying or replacing a program already stored in a memory of a conventional gaming device, an external or internal module that comprises a peripheral device may be inserted in, connected to or otherwise associated with the gaming device.

In still further embodiments, rather than configure existing gaming devices to execute aspects of the present invention by installing or connecting new hardware and/or software, software may be downloaded into an existing memory of one or more gaming devices. U.S. Pat. No. 6,805,634 to Wells et al. teaches methods for downloading data to gaming devices in such a manner. The entirety of U.S. Pat. No. 6,805,634 is incorporated by reference herein for all purposes. Thus, in some embodiments, an existing gaming device may be reprogrammed to accommodate new functionality of the present invention without the need, or by minimizing the need, to remove and replace hardware within the gaming device.

Exemplary Databases for the Controller and/or Gaming Devices

Figure 4B:
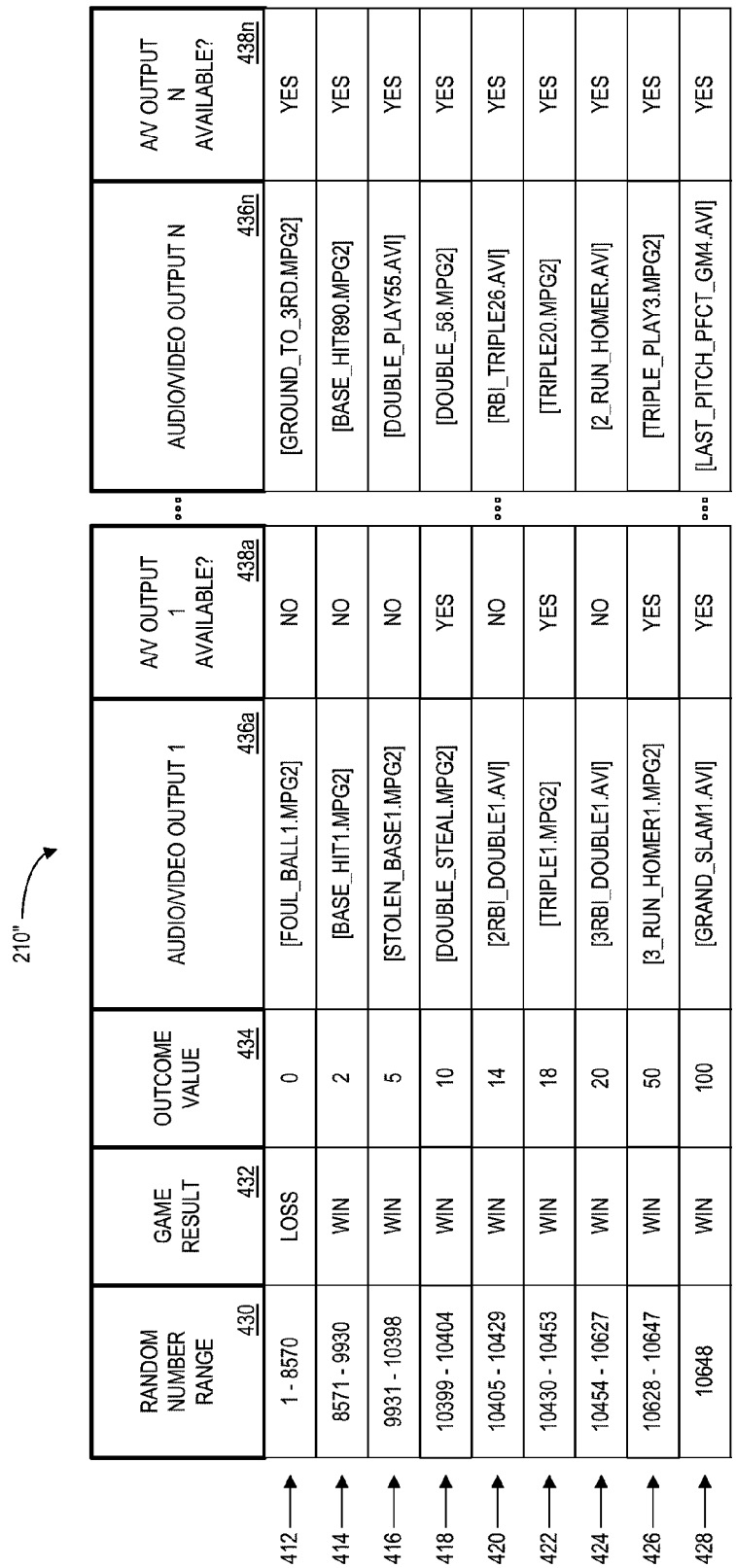
FIG. 4B illustrates a sample of the contents of a second exemplary outcome database of FIG. 2 or 3.
Figure 5:
FIG. 5 illustrates a sample of the contents of a probability database of FIG. 2 or 3.

Samples of the contents of the outcome database 210 and the probability database 212 are illustrated in FIGS. 4A-B and 5, respectively. Samples of the contents of the session status database 214 are described further below with reference to FIG. 8. The specific data and fields illustrated in these figures represent only one embodiment of the records that may be stored in the databases of the invention. The data and fields of these databases, as well as the number of databases, can be readily modified, for example, to include more or fewer data fields. A single database also may be employed. Note that in the databases of the controller 102 and/or the gaming devices 104a-n, a different reference numeral is employed to identify each field of each database. However, in at least one embodiment of the invention, fields that are similarly named (e.g., game results fields, outcome value fields, etc., described below) store similar or the same data in a similar or in the same data format.

FIG. 4A illustrates a sample of the contents of a first embodiment of the outcome database 210 of FIG. 2 or 3 (referred to as outcome database 210' in FIG. 4A for convenience). As shown in FIG. 4A, the outcome database 210' contains information related to the historical audio/video programming, game result and outcome value associated with each unique random number that may be generated by the random number generator 314 of a gaming device 104a-n. In the exemplary embodiment of FIG. 4A, the illustrated data within the outcome database 210' is based on outcome values traditionally associated with a three-reel, 22-stop slot machine. Typically, such a slot machine will have 22×22×22=10,648 possible unique random numbers. Accordingly, the outcome database 210' includes records corresponding to 10,648 possible random numbers (referred to as records 402a-n in FIG. 4A). It will be understood that other random number sizes, random number ranges, and/or game machine configurations may be employed.

With reference to FIG. 4A, and as stated above, the 10,648 possible random numbers are identified in records 402a-n, respectively. Specifically, the outcome database 210' contains records having fields corresponding to, for example, (1) a random number 404; (2) audio/video programming or "output" 406; (3) a game result 408; and (4) an outcome value 410. Such fields will be referred to as a random number field, an audio/video programming field, a game result field and an outcome value field, respectively. Other outcome information also may be stored in the outcome database 210'.

The random number field of each record 402a-n may store data (e.g., a random number 404) representing a unique random number that may be generated by the random number generator 314 of a gaming device 104a-n. In general, the random number field may store any unique identifier for a random number (e.g., a numeric, alpha-numeric or other code). As will be described below, the controller 102 and/or one or more of the gaming devices 104a-n may use random numbers 404 to access historical audio/video programming to be provided to a gaming device player, as well as game results and outcome values for the gaming device player.

The audio/video programming field of a record 402a-n may store data (e.g., audio/video output 406) that may be used by the controller 102 and/or one or more of the gaming devices 104a-n to provide historical audio/video programming to a gaming device player. For example, the audio/video programming field of one or more of the records 402a-n may store an executable audio/video programming file such as an MPEG2, MPEG, AVI, MOV, WAV or other similar file as is known in the art. Alternatively, the audio/video programming field of one or more of the records 402a-n may include a pointer to remotely stored historical audio/video programming. For example, if the outcome database 210' is located within one of the gaming devices 104a-n, an audio/video programming field may contain a pointer to a historical audio/video programming file stored within the controller 102 (or within the event recording device 106 coupled to the controller 102). Further, an audio/video programming field may contain a pointer to a historical audio/video programming file stored at any other location (e.g., in a file stored at a World Wide Web address, the event recording device 106 or other location).

The game result field of each record 402a-n may store data (e.g., a game result 408) representing a game result associated with the random number (identified by random number 404) of the record. That is, when a random number is generated by a gaming device 104a-n during game play, the controller 102 and/or the gaming device 104a-n may determine a game result for the game play by examining data stored within the game result field of the record 402a-n having a random number 404 that matches the random number generated by the gaming device 104a-n. For example, in the exemplary outcome database 210' of FIG. 4A, the game result "WIN" (e.g., the game result 408 of record 402a) is associated with the random number 00001 (e.g., the random number 404 of record 402a). Accordingly, when the random number generator 314 (FIG. 3) of one of the gaming devices 104a-n generates a random number having a value of 00001, the controller 102 and/or the corresponding gaming device 104a-n may associate a winning game result with the random number. This random number and/or game result, in turn, may be employed by the controller 102 and/or the gaming device 104a-n to determine an outcome value and/or a payout (or no payout as the case may be) for a gaming device player (as described further below).

The outcome value field of each record 402a-n may store data (e.g., an outcome value 410) representing an outcome value associated with the random number (identified by random number 404) of the record. That is, when a random number is generated by a gaming device 104a-n during game play, the controller 102 and/or the gaming device 104a-n may determine an outcome value of a game result for the game play by examining data stored within the outcome value field of the record 402a-n having a random number 404 that matches the random number generated by the gaming device 104a-n. For example, in the exemplary outcome database 210' of FIG. 4A, an outcome value of "100" (e.g., the outcome value 410 of record 402a) is associated with the random number 00001 (e.g., the random number 404 of record 402a), as is the game result "WIN" as described previously. Accordingly, when the random number generator 314 (FIG. 3) of one of the gaming devices 104a-n generates a random number having a value of 00001, the controller 102 and/or the corresponding gaming device 104a-n may associate a winning game result having an outcome value of "100" with the random number. This outcome value, in turn, may be employed by the controller 102 and/or the gaming device 104a-n to determine a payment for a gaming device player (as described further below).

The outcome database 210' may be populated with data provided to the controller 102 and/or one or more of the gaming devices 104a-n by an operator, owner or manufacturer of the controller 102 and/or the gaming devices 104a-n, or by any other relevant party. Such data population may occur, for example, via the communication port 204 of the controller 102 or via the communication port 304 of a gaming device 104a-n.

FIG. 4B illustrates a sample of the contents of a second embodiment of the outcome database 210 of FIG. 2 or 3 (referred to as outcome database 210" in FIG. 4B for convenience). As will be described further below, use of the outcome database 210" may allow the controller 102 and/or a gaming device 104a-n to ensure that particular instances of historical audio/video programming are not repeatedly output to a gaming device player should the player repeatedly achieve the same outcome value during game play, or to otherwise control historical audio/video programming output frequency.

As shown in FIG. 4B, the outcome database 210" contains information related to the audio/video programming, game result and outcome value associated with unique ranges of random numbers (for random numbers that may be generated by the random number generator 314 of a gaming device 104a-n). In the particular embodiment shown, a plurality of audio/video programming selections or audio/video programs may be associated with each number range. Such an approach may be contrasted with the outcome database 210' of FIG. 4A which contains information related to a single audio/video program, game result and outcome value associated with each unique random number that may be generated by the random number generator 314 of a gaming devices 104a-n. (Note in other embodiments of the invention, multiple audio/video programs may be associated with each unique random number.)

As with the outcome database 210' of FIG. 4A, the illustrated data within the outcome database 210" is based on outcome values traditionally associated with a three-reel, 22-stop slot machine. Typically, such a slot machine will have 22×22×22=10,648 possible unique random numbers. Accordingly, the outcome database 210" includes records corresponding to ranges of numbers (or a number) that cover 10,648 possible random numbers (referred to as records 412-428 in FIG. 4B). It will be understood that other random number sizes or ranges and/or game machine configurations may be employed.

With reference to FIG. 4B, and as stated above, the random number ranges are identified in records 412-428, respectively. Specifically, the outcome database 210" contains records having fields corresponding to, for example, (1) a random number range 430; (2) a game result 432; (3) an outcome value 434; (4) audio/video programming or outputs 436a-n; and (5) audio/video programming statuses 438a-n. Such fields will be referred to as a random number range field, a game result field, an outcome value field, audio/video programming fields and audio/video programming status fields, respectively. Other outcome information also may be stored in the outcome database 210".

The random number range field of each record 412-428 may store data (e.g., a random number range 430) representing a range of numbers (or a number) associated with a game result (identified by a game result 432) of a respective game result field and an outcome value (identified by an outcome value 434) of a respective outcome value field of the record. For example, the random number range 1-8570 (e.g., the random number range 430 of record 412) may be associated with a game result of "LOSS" (e.g., the game result 432 of record 412) and an outcome value of 0 (e.g., the outcome value 434 of record 412). Accordingly, when the random number generator 314 (FIG. 3) of a gaming device 104a-n generates a random number in the range of 1-8570, the controller 102 and/or the corresponding gaming device 104a-n may associate the game result "LOSS" and an outcome value of 0 with the random number. (The outcome value, in turn, may be employed by the controller 102 and/or the gaming device 104a-n to determine a payout for a gaming device player, as described further below.

In general, the random number range field may store any unique identifier for a random number range (e.g., a numeric, alpha-numeric or other code). As will be described below, the controller 102 and/or one or more of the gaming devices 104a-n may use random number ranges 430 to access historical audio/video programming to be provided to a gaming device player, as well as game results and outcome values for the gaming device player (as described previously).

The audio/video programming fields of a record 412-428 may store data (e.g., audio/video outputs 436*a-n*) that may be used by the controller 102 and/or one or more of the gaming devices 104*a-n* to provide historical audio/video programming to a gaming device player (e.g., to provide an indication of the outcome value of the corresponding record). For example, the audio/video programming fields of one or more of the records 412-428 may store executable audio/video programming files such as MPEG2, MPEG, AVI, MOV, WAV or other similar files as is known in the art. Alternatively, the audio/video programming fields of one or more of the records 412-428 may include pointers to remotely stored historical audio/video programming. For example, if the outcome database 210" is located within one of the gaming devices 104*a-n*, an audio/video programming fields may contain pointers to historical audio/video programming files stored within the controller 102 (or within the event recording device 106 coupled to the controller 102). Further, an audio/video programming field may contain a pointer to a historical audio/video programming file stored at any other location (e.g., in a file stored at a World Wide Web address, the event recording device 106 or other location).

The audio/video programming status fields of each record 412-428 may store data (e.g., audio/video programming statuses 438*a-n*) indicating a status of respective audio/video programming (identified by a respective audio/video programming or output 436*a-n*). For example, an audio/video programming status field may indicate whether a particular audio/video programming file, episode, program or the like is to be (or has previously been) provided to a gaming device player (e.g., to indicate a particular outcome value to which the player has become entitled during game play). In one embodiment of the invention, an audio/video programming status field initially may have a status of "YES" (indicating that the audio/video programming corresponding to the status field is to be or may be provided to a gaming device player). However, following provision of the audio/video programming to the gaming device player, the audio/video programming status field may be changed to "NO" (indicating that the audio/video programming is not to be provided to the gaming device player again). The controller 102 and/or a gaming device 104*a-n* may perform such a status-change operation. Other similar flags for the audio/video programming status fields of the records 402-418 may be employed.

In another embodiment of the invention, a player of a gaming device may select a classification of historical audio/video programming to be provided to the player during game play. In such an embodiment, the player may directly or indirectly control the status of audio/video programming (e.g., by changing the state of one or more audio/video programming status fields).

With reference to the outcome database 210" of FIG. 4B, the record 412 illustrates exemplary data for a random number range of 1-8570 (random number range 430) that may be accessed if the random number generator 314 of a gaming device 104*a-n* generates a random number that falls within this range. A random number within the range of 1-8570 results in a LOSS game result (game result 432) and an outcome value of 0 (outcome value 434). In one or more embodiments of the invention, a player of the corresponding gaming device 104*a-n* may be provided with audio/video programming that indicates the outcome value of the game result. As shown in record 412, the first audio video programming (audio/video output 436*a*) is unavailable as indicated by an audio/video programming status of NO (audio/video programming status 438*a*). However, the nth audio/video programming (audio/video output 436*n*) may be provided to the player as indicated by an audio/video programming status of YES (audio/video programming status 438*a*). Accordingly, the player may be provided at least an indication of the 0 outcome value if the controller 102 and/or the respective gaming device 104*a-n* provides audio/video programming to the player that displays, for example, a ground ball being hit to third base, with the batsman/base runner being subsequently thrown out at first (audio/video output 436*n*). The actual outcome value of 0 may or may not be displayed or otherwise output to the player. For example, according to one embodiment, the outcome value may be superimposed over the audio/video programming in a manner that allows gaming device players to easily or rationally correlate the outcome value with the audio/video content being provided. For example, using the ground ball scenario described above, a visual indication of the 0 outcome value may be displayed to the gaming device player in simultaneity with a display or other output of an umpire calling the batsman/base runner out.

The outcome database 210" may be populated with data provided to the controller 102 and/or one or more of the gaming devices 104*a-n* by an operator, owner or manufacturer of the controller 102 and/or the gaming devices 104*a-n*, or by any other relevant party. Such data population may occur, for example, via the communication port 204 of the controller 102 or via the communication port 304 of a gaming device 104*a-n*. Note that in one or more embodiments of the invention, differing numbers of audio/video programming may be associated with different random number ranges (e.g., as records, such as record 428, with random number ranges that are accessed infrequently may only a require a few audio/video programming options to ensure that a gaming device player does not view the same audio/video programming repeatedly).

Referring now to FIG. 5, an illustrative sample of the contents of the probability database 212 of FIG. 2 or 3 is shown. As described further below, the probability database 212 contains information that may be utilized by the controller 102 and/or one or more of the gaming devices 104*a-n* to establish frequencies with which various outcome values occur during game play.

With reference to FIG. 5, the probability database 212 contains frequency information for nine number ranges as provided in records 502-518, respectively. Specifically, the probability database 212 contains records having fields corresponding to, for example, (1) a random number range 520; (2) an outcome value 522; and (3) an expected number of hits per cycle 524. Such fields will be referred to as a random number range field, an outcome value field and an expected hits per cycle field, respectively. Other probability information also may be stored in the probability database 212.

The random number range field of each record 502-518 may store data (e.g., a random number range 520) representing a range of numbers (or a number) associated with an outcome value (identified by an outcome value 522 of a respective outcome value field of the record). For example, the random number range 1-8570 (e.g., the random number range 520 of record 502) may be associated with an outcome value of 0 (e.g., the outcome value 522 of record 502). Accordingly, when the random number generator 314 (FIG. 3) of a gaming device 104*a-n* generates a random number in the range of 1-8570, the controller 102 and/or the corresponding gaming device 104*a-n* may associate an outcome value of 0 with the random number. This outcome value, in turn, may be employed by the controller 102 and/or the gaming device 104a-n to determine a payout for a gaming device player, as described further below.

The expected hits per cycle field of a record 502-518 may store data (e.g., expected hits per cycle 524) that indicates the expected or average number of times a random number associated with a given outcome value will be generated by the random number generator 314 of a gaming device (FIG. 3) over a complete cycle of the gaming device. In the exemplary embodiment of FIG. 5, the data within the probability database 212 is suitable for use with a three-reel, 22-stop slot machine. Such a slot machine will have 22×22×22=10,648 possible outcomes. To operate in such an embodiment, the random number generator 314 of FIG. 3 may be adapted to generate a random number having a value between 1 and 10,648. In this manner, the random number generator 314 (FIG. 3) will only generate a number that falls within the random number ranges 520 of the probability database 212. Referring again to FIG. 5, over the course of 10,648 game plays, the expected hits per cycle 524 associated with a record 502-518 specifies an expected or average number of times a random number associated with a given outcome value will be generated by the random number generator 314 (FIG. 3) during a complete cycle of the gaming device. It will be understood that other number ranges, outcome values, expected hits per cycle and/or slot machine configurations based on other arrangements (e.g., other numbers of reels and/or stops per reel) may be employed.

The probability database 212 may be populated with data provided to the controller 102 and/or one or more of the gaming devices 104a-n by an operator, owner or manufacturer of the controller 102 and/or gaming devices 104a-n, or by any other relevant party. Such data population may occur, for example, via the communication port 204 of the controller 102 or via the communication port 304 of a gaming device 104a-n.

First Exemplary Operation of the Gaming Device Control System

Figure 6:
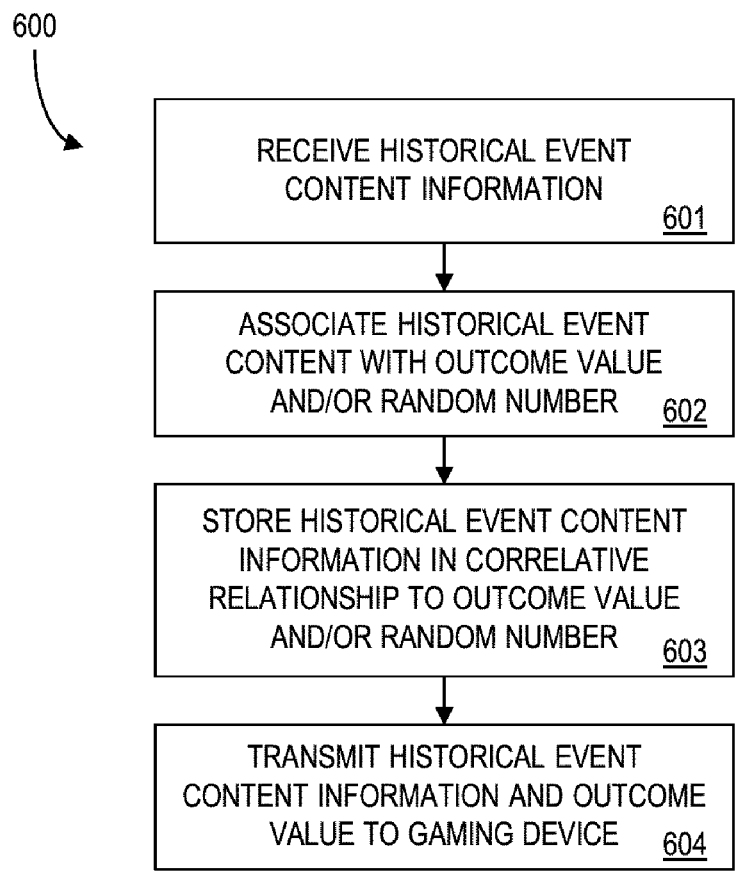
FIG. 6 illustrates a flow chart of a first exemplary process of the gaming device control system of FIGS. 1-5 useful in describing the general operation of the gaming device control system.

FIG. 6 illustrates a flow chart of a first exemplary process 600 of the gaming device control system 100 of FIGS. 1-5 useful in describing the general operation of the gaming device control system 100. One or more of the steps of the process 600 may be embodied within computer program code of the program 208 of the controller 102 and/or the program 308 of one or more of the gaming devices 104a-n. The above-mentioned computer program code may be embodied in one or more computer program products.

With reference to FIG. 6, the process 600 begins in step 601 in which historical audio/video programming or other similar historical event content information is received by the controller 102 and/or one or more of the gaming devices 104a-n. In at least one embodiment of the invention, the audio/video programming may be stored locally at the controller 102 and/or one or more of the gaming devices 104a-n (e.g., within the data storage device 206 of the controller 102, the memory 320 or data storage device 306 of a gaming device 104a-n, etc.). Alternatively, a pointer to audio/video programming may be received and/or stored by the controller 102 and/or one or more of the gaming devices 104a-n (e.g., a WORLD WIDE WEB or other similar address).

Audio/video programming (or pointers to such programming) may be received from a variety of sources. For example, audio/video programming, pointers and/or other information may be provided to the gaming devices 104a-n via the controller 102. Further audio/video programming, pointers and/or other information may be provided to the gaming devices 104a-n and/or the controller 102 from a source outside of the gaming device control system 100 (e.g., from another event recording device, a casino owner or operator or other third party). In one or more embodiments of the invention, audio/video programming may be provided to the controller 102 and/or one or more of the gaming devices 104a-n from a portable media such as a DVD, CD-ROM, etc., from hardware such as a hard disk, dedicated server, set top box (e.g., a TiVo® unit manufactured by Phillips™), etc., from the Internet (e.g., via a download from the World Wide Web), or from any other similar source. Additionally, the controller 102 and/or one or more of the gaming devices 104a-n may create audio/video programming (e.g., animated audio/video programming).

In step 602, the historical audio/video programming is associated with an outcome value of a game result of a gaming device 104a-n. For example, the controller 102, the gaming device 104a-n, an operator of the controller 102 and/or gaming device 104a-n, etc., may examine the received historical audio/video programming and determine what, if any, outcome value may be associated with the historical audio/video programming (e.g., determine an outcome value of a game result of the gaming device 104a-n that may be suggested, implied, hinted at, signified, or discerned by or that is otherwise "indicatable" by the content of the audio/video programming). For example, if the historical audio/video programming depicts a high quality of performance, a high level of achievement and/or an event of historical significance, the audio/video programming may be associated with a high outcome value (e.g., by associating the audio/video programming directly with the outcome value or with a random number or range of random numbers associated with the outcome value).

As a further example, the content of historical audio/video programming received by the controller 102 and/or a gaming device 104a-n may include a sporting event highlight, such as a basketball player attempting a shot. In such an embodiment, the controller 102, the gaming device 104a-n, a controller/operator of one or more of the same, etc., may review the audio/video programming and determine an appropriate outcome value to be associated with the audio/video programming (e.g., an outcome value that may be indicated by the audio/video programming). In one embodiment of the invention, a missed shot (e.g., basketball, hockey, soccer, etc.) depicted in audio/video programming may be associated with an outcome value of 0 or another low outcome value. Likewise, a successful shot/score may be associated with a higher outcome value. Audio/video programming with content of great historical significance or depicting a high level of performance or achievement may be associated with a very high outcome value. For example, Michael Jordan's game winning shot with 5.2 seconds remaining in game 6 of the 1997-1998 NBA finals, a hole-in-one, a perfect 10 or other flawless execution, may be associated with a jackpot or other high outcome value.

In step 603, the historical audio/video programming is stored such that the outcome value (or an indication of the outcome value) is correlated to at least a pointer to the historical audio/video programming (e.g., the audio/video programming is stored in a correlative relationship to the outcome value and/or a random number associated with the outcome value). For example, an indication of the historical audio/video programming (e.g., a file, a pointer to the file, etc.) may be stored within the outcome database 210' (FIG. 4A) or the outcome database 210" (FIG. 4B) in one of the records 402a-n or 412-428, respectively.

If the historical audio/video programming already resides in a gaming device 104a-n (e.g., if at least step 603 was performed at the gaming device 104a-n), then the process 600 may end at step 603. Otherwise, at step 604, the historical audio/video programming (or a pointer to the historical audio/video programming) and the associated outcome value may be transmitted to one or more gaming devices 104a-n. For example, the historical audio/video programming (or a pointer to the historical audio/video programming) and/or the associated outcome value may be transmitted to one or more gaming devices 104a-n from the controller 102, the event recording device 106 and/or any other location. Thereafter, the process 600 ends.

Second Exemplary Operation of the Gaming Device Control System

Figure 7A:
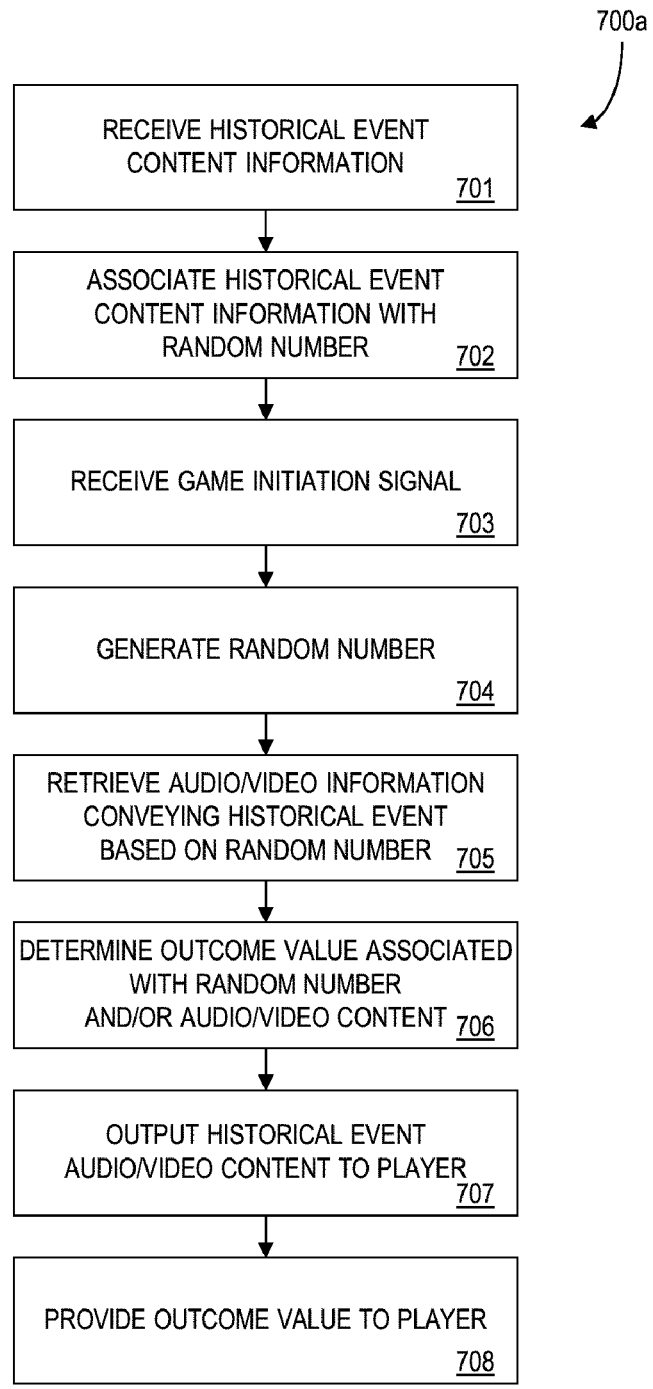
FIG. 7A illustrates a flow chart of a second exemplary process of the gaming device control system of FIGS. 1-5.

FIG. 7A illustrates a flow chart of a second exemplary process 700a of the gaming device control system 100 of FIGS. 1-5 useful in describing the general operation of the gaming device control system 100. One or more of the steps of the process 700a may be embodied within computer program code of the program 208 of the controller 102 and/or the program 308 of one or more of the gaming devices 104a-n. The above-mentioned computer program code may be embodied in one or more computer program products.

With reference to FIG. 7A, the process 700a begins in step 701 in which historical audio/video programming or other similar historical event content information is received by the controller 102 and/or one or more of the gaming devices 104a-n. Such a step may be similar to that of step 601 of process 600 of FIG. 6 and/or may be eliminated if the audio/video programming has already been received (e.g., and stored locally at one or more of the gaming devices 104a-n).

As stated, the received historical audio/video programming may be stored locally at the controller 102 and/or one or more of the gaming devices 104a-n (e.g., within the data storage device 206 of the controller 102, the memory 320 or data storage device 306 of a gaming device 104a-n, etc.). Alternatively, a pointer to audio/video programming may be received and/or stored by the controller 102 and/or one or more of the gaming devices 104a-n (e.g., a WORLD WIDE WEB or other similar address).

Audio/video programming (or pointers to such programming) may be received from a variety of sources. For example, audio/video programming, pointers and/or other information may be provided to the gaming devices 104a-n via the controller 102. Further audio/video programming, pointers and/or other information may be provided to the gaming devices 104a-n and/or the controller 102 from a source outside of the gaming device control system 100 (e.g., from another event recording device, a casino owner or operator, gaming device manufacturer or other third party). In one or more embodiments of the invention, audio/video programming may be provided to the controller 102 and/or one or more of the gaming devices 104a-n from a portable media such as a DVD, CD-ROM, etc., from hardware such as a hard disk, dedicated server, set top box (e.g., a TiVo® unit manufactured by Phillips®), etc., from the Internet (e.g., via a download from the World Wide Web), or from any other similar source. Additionally, the controller 102 and/or one or more of the gaming devices 104a-n may create or assist in the creation of audio/video programming (e.g., animated audio/video programming).

In step 702, the historical audio/video programming is associated with an outcome value of a game result of a gaming device 104a-n. Again, such a step may be similar to that of step 602 of process 600 of FIG. 6 and/or may be eliminated if the audio/video programming has already been associated with an outcome value. In one exemplary embodiment, a gaming device 104a-n may associate received historical audio/video programming and a corresponding outcome value with a random number or a range of random numbers (e.g., based on information stored within the probability database 212 (FIG. 5) of the controller 102 and/or the gaming device 104a-n). In another embodiment, the controller 102 may associate random numbers and/or random number ranges with historical audio/video programming and a corresponding outcome value, and such information may be transmitted to and stored locally at one or more gaming devices 104a-n (or retrieved from the controller 102 by one or more gaming devices 104a-n).

In general, more than one random number, random number range and/or outcome value may be associated with a particular historical audio/video programming content (or portion thereof) based on, for example, an audio/video content profile, a history of audio/video content previously provided (e.g., to a particular player), and/or a random determination.

In one embodiment, an audio/video content profile may be associated with audio/video programming in order to establish one or more context(s) for the audio/video programming. For example, audio/video depicting New York Yankees' third baseman Aaron Boone's game-winning home run in game seven of the 2003 American League Championship Series against the Boston Red Sox may be associated with a high outcome value as it relates to Yankees history or highlights (a first content profile) and also a very low (or even negative) outcome value as it relates to Red Sox history or highlights (a second content profile). Such profiles may be employed by the gaming device and/or the controller for use in determining appropriate audio/video for output e.g. based on a player request. For example, a player may select audio/video content associated with a particular sports team, athlete, actor or actress, etc., as described herein.

In another example, a particular historical audio-video programming content may be associated with a first payout table, a second payout table and a third payout table (e.g., a particular episode of a television show may be associated with all three possible payout tables). Upon selection of the episode by a player, one of the three payout tables may be selected for use in determining values for results of game plays during a play session. Such an embodiment may be helpful in a circumstance in which a player typically selects the same (e.g., favorite) episode of a television show for use in outputting values of results of game plays during different play sessions, so that the player may receive different values or payouts for the different play sessions utilizing the episode and thus not be able to predict the payouts for the episode and grow bored with the episode.

In step 703, a game initiation signal is received by a gaming device 104a-n. The game initiation signal may comprise, for example, an indication of a wager by a gaming device player, actuation of a button, handle or lever, menu selection, etc. In one or more embodiments, a gaming device 104a-n may receive a game initiation signal via the input device 310 or the communication port 304 (e.g., from the controller 102 or some other source).

In step 704, the controller 102 and/or a gaming device 104a-n may initiate game play at the respective gaming device 104a-n (e.g., in response to the game initiation signal). For example, the controller 102 and/or the respective gaming device 104a-n (e.g., via computer program code) may instruct the random number generator 314 of the gaming device to generate a random number. In one or more embodiments of the invention, the controller 102 may initiate game play at a gaming device by transmitting a game initiation signal to the gaming device (e.g., via the communication port 204 of the controller 102). In an alternate embodiment of the invention, a gaming device player may be directed/required to initiate game play at a gaming device in response to a game initiation signal. In accordance with another embodiment, game play may be automatically initiated periodically (e.g. every 15 seconds) by the gaming device 104a-n, with the gaming device player being given the option to "opt-out" of game play (i.e. to not actively wager on the game play). In yet another embodiment, a player may commit to a contract for a play session by pre-paying for a plurality of game plays (e.g., a player may purchase a specified number of game plays or a specified amount of play time on a gaming device). In such an embodiment, the game plays defined by the contract or pre-payment may be automatically executed for the player (e.g., the player need not actuate a start controller for each game play after initiating the contract).

In steps 705 and 706, based on the random number generated by a gaming device 104a-n in step 704, the controller 102 and/or the gaming device 104a-n may determine historical audio/video programming and an outcome value for a game result of the initiated game play. For example, the controller 102 and/or the gaming device 104a-n may access the game result field, the audio/video programming field and the outcome value field of the record 402a-n of the outcome database 210' (FIG. 4A) having a random number 404 that matches the random number generated in step 704; and determine a game result, audio/video programming and an outcome value based on the contents of the game result field, the audio/video programming field and the outcome value field of the record. Likewise, the controller 102 and/or the gaming device 104a-n may access the game result field, the audio/video programming fields and the outcome value field of the record 412-418 of the outcome database 210" (FIG. 4B) having a random number range 430 that includes the random number generated in step 704; and determine a game result, audio/video programming and an outcome value based on the contents of the game result field, the audio/video programming fields and the outcome value field of the record. Note that more than one audio/video programming selection may be available if the outcome database 210" of FIG. 4B is employed (e.g., depending on the various audio/video programming field statuses of the respective record). (Note that steps 705 and 706 may be performed in any order.)

In step 707, the historical audio/video programming retrieved at step 705 is provided (e.g., output or otherwise displayed) to the gaming device player. For example, the controller 102 and/or a gaming device 104a-n may execute a file containing audio/video programming and stored within the outcome database 210' of FIG. 4A or the outcome database 210" of FIG. 4B (e.g., an MPEG2, MPEG, AVI, MOV, WAV or other similar file), and output audio/video content via an appropriate device (e.g., the output device 312 of one of the gaming devices 104a-n). Alternatively, the controller 102 and/or a gaming device 104a-n may host or output programming received from another source (e.g., a gaming device 104a-n may host/output programming received from the controller 102, the controller 102 and/or a gaming device 104a-n may host/output programming received from a remote location such as from a dedicated server, the Internet or the event recording device 106).

In step 708, any payout due to the gaming device player (based on the game result and/or outcome value of the game play initiated at step 703 and/or 704) is provided or otherwise indicated to the gaming device player. For example, the controller 102 and/or the respective gaming device 104a-n may access the outcome value field of the appropriate record 402a-n of the outcome database 210' or the outcome value field of the appropriate record 412-428 of the outcome database 210" to determine the payout due to the gaming device player. In one or more embodiments, the payout the gaming device player is to receive may be equal to or based on the outcome value achieved by the gaming device player during game play. In at least one embodiment of the invention, the controller 102 and/or a gaming device 104a-n may direct the hopper 318 (via the corresponding hopper controller 316) to dispense a predetermined payout to the gaming device player. The payout may be cash deposited to a coin tray of a gaming device, posted to an account associated with the gaming device player (e.g., as a credit), a voucher or printed receipt that includes a bar code (or other indicia) that may be subsequently validated/redeemed, etc. Following step 708, the process 700a of FIG. 7A ends.

Third Exemplary Operation of the Gaming Device Control System

Figure 7B:
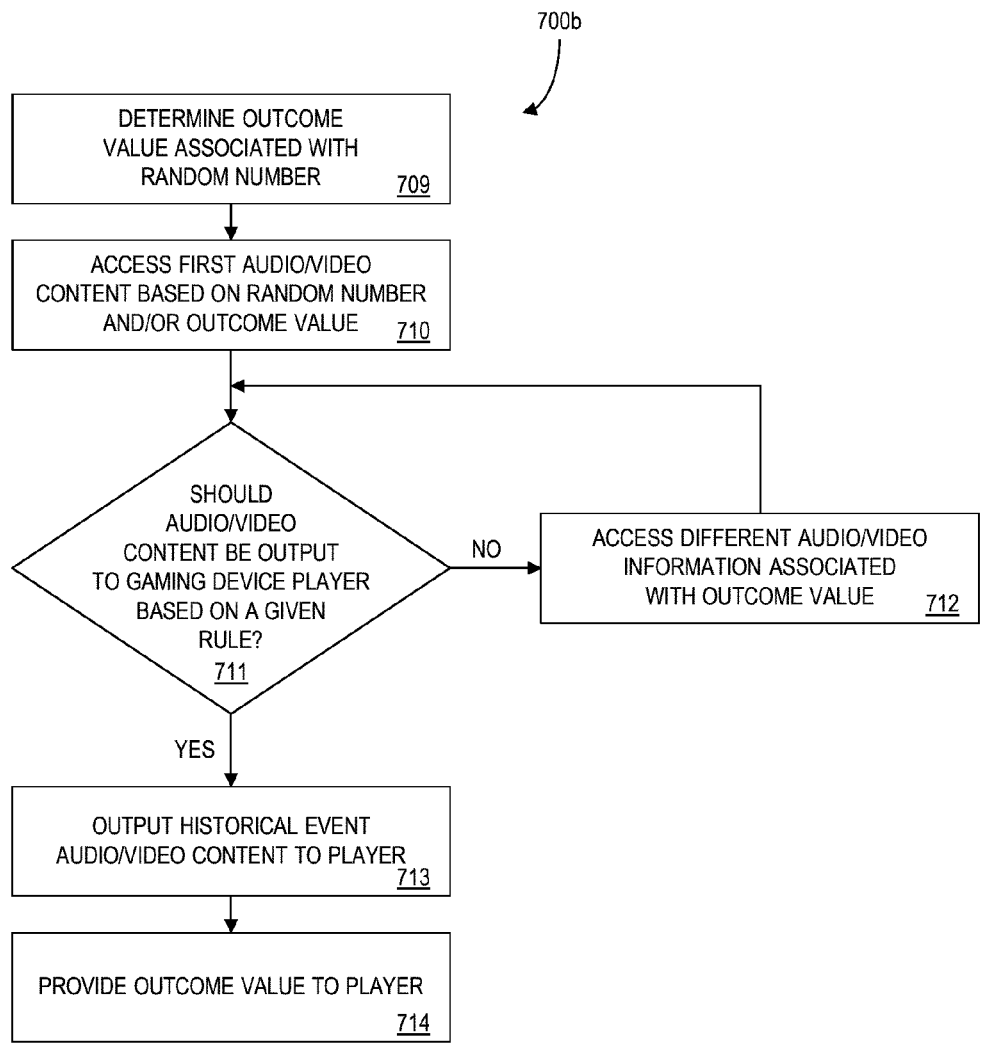
FIG. 7B illustrates a flow chart of a third exemplary process of the gaming device control system of FIGS. 1-5.

FIG. 7B illustrates a flow chart of a third exemplary process 700b of the gaming device control system 100 of FIGS. 1-5 useful in describing the general operation of the gaming device control system 100. More specifically, FIG. 7B illustrates a process for controlling which historical audio/video programming is provided to a gaming device player during game play (e.g., to prevent the same historical audio/video programming from being replayed repeatedly if the gaming device player achieves the same outcome value repeatedly, or to otherwise control audio/video programming presentation). One or more of the steps of the process 700b may be embodied within computer program code of the program 208 of the controller 102 and/or the program 308 of one or more of the gaming devices 104a-n. The above-mentioned computer program code may be embodied in one or more computer program products.

The process 700b may be performed following game initiation at a gaming device 104a-n (such as after step 703 in FIG. 7A). With reference to FIG. 7B, the process 700b begins in step 709 wherein, based on the random number generated by a gaming device 104a-n (e.g., in response to a game initiation signal), the controller 102 and/or the gaming device 104a-n determines an outcome value for a game result of game play initiated at the gaming device 104a-n. In one or more embodiments of the invention, the controller 102 and/or the gaming device 104a-n may access the outcome value field of the record 412-418 of the outcome database 210" (FIG. 4B) having a random number range 430 that includes the random number generated by the respective gaming device 104a-n; and determine an outcome value based on the content of the outcome value field of the record. The random number thus serves as an index that may be employed to access a record of the outcome database 210". A corresponding game result also may be determined. Note that random numbers rather than random number ranges may be employed to access outcome values (and/or game results) as described previously with reference to the outcome database 210' of FIG. 4A.

In step 710, based on the random number employed to retrieve the outcome value in step 709, the controller 102 and/or the respective gaming device 104a-n may determine or otherwise access first historical audio/video programming. For example, the controller 102 and/or the gaming device 104a-n may access the first audio/video programming field of the record 412-418 of the outcome database 210" (FIG. 4B) having a random number range 430 that includes the random number generated by the respective gaming device 104a-n, and determine the first historical audio/video programming based on the content of the first audio/video programming field of the record. The outcome value alternatively may be employed as an index into the appropriate record, and/or random numbers rather than random number ranges may be employed to access audio/video programming.

In step 711, a determination is made (e.g., by the controller 102 and/or the respective gaming device 104a-n) whether the first audio/video programming should be provided to the gaming device player. For example, the controller 102 and/or the respective gaming device 104a-n may examine the audio/video programming status field (FIG. 4B) corresponding the first audio/video programming (e.g., the first audio/video programming status field of the record 412-428 that includes or points to the first audio/video programming determined/accessed in step 710). Based on the current state of the status field, the controller 102 and/or the respective gaming device 104a-n may determine whether the first audio/video programming should be provided to the gaming device player.

As stated, there may be instances in which it may be undesirable to provide particular audio/video programming content to a gaming device player. For example, if the gaming device player repeatedly achieves the same outcome value during game play, the gaming device player may not wish to view the same audio/video programming over-and-over again. Accordingly, in one or more embodiments of the invention, more than one audio/video programming selection may be associated with an outcome value, and the controller 102, one or more of the gaming devices 104a-n, a gaming device player or any other relevant party may determine, for example, how often (if ever) audio/video programming may repeat during game play. Such an approach may provide the controller 102 and/or the gaming devices 104a-n with increased flexibility with regard to a broad range of programming content to be output to a gaming device player.

If it is determined in step 711 that the first audio/video programming should not be provided to the gaming device player (e.g., based on the first audio/video programming status field of the corresponding record of the outcome database 210"), in step 712, the controller 102 and/or the respective gaming device 104a-n may determine or otherwise access different audio/video programming for the gaming device player. Step 711 then may be repeated to determine if the newly accessed audio/video programming should be provided to the gaming device player (as described above). Steps 711 and 712 may be repeated until audio/video programming been accessed that may be provided to the gaming device player.

Once historical audio/video programming has been found that may be provided to the gaming device player, the process 700b proceeds to step 713. In step 713, the historical audio/video programming is provided (e.g., output or otherwise displayed or provided) to the gaming device player. For example, the controller 102 and/or a gaming device 104a-n may execute a file containing audio/video programming as described previously with reference to step 707 of FIG. 7A (e.g., an MPEG2, MPEG, AVI, MOV, WAV or other similar file stored, for example, in the outcome database 210"), and output audio/video content via an appropriate device (e.g., the output device 312 of the gaming device 104a-n). Alternatively, the controller 102 and/or a gaming device 104a-n may host or output programming received from another source (e.g., a gaming device 104a-n may host/output programming received from the controller 102, the controller 102 and/or a gaming device 104a-n may host/output programming received from a remote location such as from a dedicated server, the Internet or the event recording device 106).

In step 714, any payout due to the gaming device player is provided to the gaming device player. For example, the controller 102 and/or the respective gaming device 104a-n may access the outcome value field of the appropriate record 412-428 of the outcome database 210" to determine the payout due to the gaming device player. In one or more embodiments of the invention, the payout the gaming device player is to receive may be equal to or based on the outcome value achieved by the gaming device player during game play. In at least one embodiment of the invention, the controller 102 and/or a gaming device 104a-n may direct the hopper 318 (via the corresponding hopper controller 316) to dispense a predetermined payout to the gaming device player. The payout may be cash deposited to a coin tray of a gaming device, an amount of currency posted to an account associated with the gaming device player (e.g., as a credit), electronic currency added to a smart card, a voucher or printed receipt that includes a bar code or other indicia that may be subsequently validated/redeemed, etc. Following step 714, the process 700b of FIG. 7B ends.

Exemplary Embodiment of the Session Status Database

FIG. 8 illustrates a sample of the contents of the session status database 214 of the controller 102 of FIG. 2. As stated, one or more of the gaming devices 104a-n may be similarly configured to employ a session status database.

With reference to FIG. 8, the session status database 214 includes data relevant to various gaming sessions being conducted and/or that have been conducted at one or more of the gaming devices 104a-n. As will be described further below, the controller 102 may employ the session status database to determine whether or not certain historical audio/video programming should be made available to a gaming device player during a session of game play at a gaming device (e.g., whether an audio/video programming status field associated with audio/video programming should be "flagged" to allow or prevent provision of the audio/video programming to a gaming device player as described previously with reference to the outcome database 210" of FIG. 4B). A similar session status database may be employed by one or more of the gaming devices 104a-n to regulate/control audio/video programming that is provided to a gaming device player during game play.

As shown in FIG. 8, the session status database 214 contains information related to five gaming device players (e.g., engaged in gaming sessions at five different gaming devices being monitored and/or controlled by the controller 102). The five gaming device players are identified in records 802-810, respectively. Specifically, the session status database 214 contains records having fields corresponding to, for example, (1) a player identifier 812; (2) a gaming device identifier 814; (3) a session start date/time 816; (4) a number of handle pulls 818; and (5) audio/video programming or output information 820a-n. Such fields will be referred to as a player identifier field, a gaming device identifier field, a start date/time field, a number of handle pulls field and audio/video programming information fields, respectively. Other player/gamming session information also may be stored in the session status database 212.

The player identifier field of each record 802-810 may store data (e.g., a player identifier 812) representing a unique identifier (e.g., a numeric, alpha-numeric or other code) for a player of a gaming device, such as one of the gaming devices 104a-n. The information stored in the player identifier field may be derived, for example, from a player tracking card at a gaming device, may be provided by the player, or may be obtained by any other method.

The gaming device identifier field of a record 802-810 may store a generalized textual, graphical or other description (e.g., a gaming device identifier 814) for a gaming device being employed by a player identified by a respective player identifier 812 of the record. Thus, a gaming device identifier field may be employed by the controller 102 (and/or a gaming device 104a-n) to identify the gaming device being employed by a gaming device player.

The session start date/time field of a record 802-810 may store date and/or time information that identifies when a gaming device player (identified by the player identifier 812 of the record) began a gaming session, game play or other activity at a gaming device (identified by the gaming device identifier 814 of the record). In one or more embodiments of the invention, information stored in the session start date/time field of a record 802-810 may be employed by the controller 102 and/or a gaming device 104a-n to determine the availability of certain historical audio/video programming to a gaming device player. For example, an audio/video programming status field (FIG. 4B) associated with audio/video programming may be periodically updated or reset to allow previously displayed and/or disabled audio/video programming to be provided to a gaming device player during a gaming session (e.g., even though the same audio/video programming has already been provided to the gaming device player during the gaming session).

The number of handle pulls field of a record 802-810 may store information that identifies the number of times game play has been initiated by a gaming device player (identified by the player identifier 812 of the record) of a gaming device (identified by the gaming device identifier 814 of the record). In one or more embodiments of the invention, information stored in the number of handle pulls field of a record 802-810 may be employed by the controller 102 and/or a gaming device 104a-n to determine the availability of certain historical audio/video programming to a gaming device player. For example, an audio/video programming status field (FIG. 4B) associated with audio/video programming may be updated or reset to allow previously displayed and/or disabled audio/video programming to be provided to a gaming device player during a gaming session if the gaming device player has performed a predetermined number of handle pulls (e.g., even though the same audio/video programming has already been provided to the gaming device player during the gaming session). For non-handle initiated games, other parameters may be similarly employed for controlling/affecting audio/video programming availability (e.g., a number of times a game initiation button has been pressed, a number of times game play has been automatically initiated at the gaming device, etc).

The audio/video programming information fields of a record 802-810 may store information (e.g., audio/video programming information 820a-820n) that describes and/or identifies instances of audio/video programming that have been output to a gaming device player identified by the player identifier 812 of the record (e.g., in accordance with the present invention so as to indicate an outcome value of a game result of game play at a gaming device identified by the gaming device identifier 814 of the record). In one or more embodiments of the invention, information stored in the audio/video programming information fields of a record 802-810 may be employed by the controller 102 and/or a gaming device 104a-n during the selection of audio/video programming from a plurality of audio/video programming selections that are associated with an outcome value. For example, the controller 102 and/or a gaming device 104a-n may examine the audio/video programming information fields (audio/video programming information 820a-820n) to determine if a particular audio/video programming selection has been previously provided to a gaming device player (e.g., a particular audio/video programming selection accessed, for example, during step 710 or step 712 of the process 700b of FIG. 7B).

The session status database 214 may be populated with data provided to the controller 102 and/or one or more of the gaming devices 104a-n by an operator, owner or manufacturer of the controller 102 and/or the gaming devices 104a-n, or by any other relevant party. Such data population may occur, for example, via the communication port 204 of the controller 102 or via the communication port 304 of a gaming device 104a-n.

With reference to the session status database 214 of FIG. 8, the record 802 illustrates exemplary data for a gaming device player P 161 (player identifier 812) that is participating in a gaming session at gaming device M 601 (gaming device identifier 814). The player P 161 began game play activity at the gaming device M 601 on Jan. 1, 2005 at 1:55 pm (session start date/time 816), and has initiated game play 86 times (number of handle pulls 818). In response to the 86 game plays, the player P 161 has been provided a plurality of audio/video programs (audio/video programming information 820a-820n).

Embodiments of the present invention thus provide methods, apparatus, systems, computer program products and the like for employing audio/video programming to indicate an outcome value of game play at a gaming device such as a slot machine, video poker machine, etc. For example, the invention may be employed to display an outcome value to a gaming device player, based on pre-established payouts and/or probabilities associated with a gaming device (e.g., a slot machine), in the form of historical audio/video programming (e.g., audio/video information representative of a historical event). As described, such historical audio/video programming may include, for example, content that depicts a professional athlete executing a golf shot, a football play (e.g., a kick return), a baseball event (e.g., a single pitch/hit in a home run derby) or similar physical contest, an actor, actress performing in a soap opera or situational comedy scene, etc., an animated movie or feature, or any other similar audio/video programming embodied in a digital, an analog or another format. As a further example, where historical audio/video programming depicts an acting scene, content such as outtakes, bloopers, poorly-acted scenes and/or scenes having little significance to an overall establishment of a plot may be associated with reduced outcome values. Likewise, content that depicts well-acted scenes or scenes of greater significance or impact to an overall establishment of a plot may be associated with greater outcome values.

As described above, the present invention may be implemented via a random number determination process (e.g., employing a random number as an index to historical audio/video programming), so as to be compatible with the majority of existing casino gaming devices. In one particular embodiment of the invention, the historical audio/video programming to be output to a gaming device player may be representative of one or more golfers executing golf shots during a golf tournament. Such an embodiment is advantageous in that a large number of audio/video programming selections may be recorded, created or otherwise captured during a typical golf tournament. For example, a four-day golf tournament including a field of 72 golfers and having an average perround score of par 72 may yield in excess of 20,000 historical audio/video selections (e.g., 72×72×4=20,736 golf strokes that may be recorded and employed to indicate outcome values of game results). Each golf stroke may be reviewed, interpreted and correlated to an outcome value of a gaming machine, and used to indicate an outcome value to a gaming device player. For example, a hole-in-one may be associated with a top jackpot, while a missed short putt or errant shot may be associated with an outcome value of 0.

The use of golf-related audio/video programming in accordance with the present invention is also advantageous in that certain probabilities associated with the game of golf closely resemble probabilities associated with slot machines. For example, the known general odds of a professional golfer executing a hole-in-one on a given par 3 tee shot are approximately the same as the known odds of a slot machine player achieving a top jackpot with any given pull of an average 22-stops-per-reel, 3-reel, non-progressive jackpot slot machine (e.g., approximately 1 in 10,000+).

The foregoing description discloses only exemplary embodiments of the invention. Modifications of the above disclosed apparatus and methods which fall within the scope of the invention will be readily apparent to those of ordinary skill in the art. For instance, in at least one embodiment of the invention, a gaming device player may establish one or more parameters for use by the controller 102 and/or a gaming device 104a-n during selection of historical audio/video programming to be output to the gaming device player. As an example, the controller 102 and/or a gaming device 104a-n may provide a menu or list of options for a gaming device player that allows the player to select a classification of audio/video programming to receive during game play (e.g., the audio/video programming providing an indication of an outcome value of a game result). A classification of audio/video programming may include audio/video programming relating to one or more of a specific sports team (e.g., a favorite baseball team), athlete, course, stadium, field, golf hole selection, venue, actor or actress, character(s), episode, season, era or time period, game (e.g., the World Series, the 1997 World Series, World Series game 7, the Superbowl™, etc.).

The controller 102 and/or a gaming device 104a-n may employ classification information provided by a gaming device player to limit or otherwise control the content of historical audio/video programming provided to the gaming device player during game play. For example, the controller 102 and/or a gaming device 104a-n may store a plurality of outcome tables (e.g., within one or more of the outcome databases 210, 210', 210") each containing historical audio/video programming (or pointers to such programming) that relates to and/or is based on the classification of audio/video programming selected by a gaming device player (e.g., audio/video programming that relates only to the team, athlete, actor, character(s), etc., selected by the gaming device player). Outcome values may be associated and stored with the audio/video programming.

TABLE 1 includes a list of exemplary classifications of audio/video programming that may be provided and/or made available to a gaming device player in accordance with the present invention (e.g., and used to indicate an outcome value of a game result of game play at a gaming device 104a-n). The data in TABLE 1 is merely exemplary, and it will be understood that other classifications of audio/video programming may be employed. In general, such classifications may be selected by a gaming device player, the controller 102, a gaming device 104a-n, or any other relevant party. Further, more than one classification of audio/video programming may be provided during game play and/or a gaming session.

TABLE 1

| CLASSIFICATION OF AUDIO/VIDEO PROGRAMMING | EXEMPLARY CONTENT FOR LOW OUTCOME VALUE | EXEMPLARY CONTENT FOR HIGH OUTCOME VALUE |
| --- | --- | --- |
| figure skating | flawed execution | Olympic gold performance |
| bowling | missed spare | perfect game |
| tennis | unforced error | match winning shot |
| hockey | shot wide | OT winning goal |
| Stock car racing | side-by-side race | checkered flag |
| boxing | separating fighters | KO punch |
| wrestling | lull in action | 3-count pin |
| billiards/pool | missed shot | sunk trick shot |
| action sports | missed trick | contest winner |
| reality TV (e.g., Cops) | failed investigation | most wanted arrest |
| TV Drama, SitCom | blooper/out take; character experiences a negative event (e.g., gets dumped by his date) | Emmy-winning performance; character experiences a positive event (e.g., receives a welcomed proposal for marriage) |
| Talk Shows | denial | reconciliation |
| Game Shows | incorrect answer | correct answer |
| Nature Shows | common domestic animal scene | rare/exotic animal scene |

In another embodiment of the invention, historical audio/video programming may form the basis of a bonus game at a gaming device 104a-n. For example, audio/video programming such as a scene from a situational comedy (SitCom) or other episode of programming, may be displayed to a gaming device player to indicate an outcome value of game play. Thereafter, the gaming device player may be prompted with a bonus trivia question (e.g., by the controller 102 and/or a gaming device 104a-n), and be entitled to an additional payout if the player answers the question correctly. Exemplary bonus questions might include the season in which the episode first aired, the name of the actor that plays the lead character, etc.

In yet another embodiment of the invention, historical audio/video programming may be output to a gaming device player (e.g., by the controller 102 and/or a gaming device 104a-n) in a manner that provides commonality or continuity during game play (e.g., from one presentation of audio/video programming to the next during a gaming session). For example, if audio/video programming to be presented to a gaming device player is to be based on a golf classification in which a golfer executes golf shots on an 18-hole golf course, the controller 102 and/or a gaming device 104a-n may provide audio/video programming associated with the first golf hole of the golf course during the beginning portion of a gaming session, and may provide audio/video programming associated with subsequent golf holes thereafter (e.g., sequentially so that the game player "progresses" through the 18-hole golf course during game play at the gaming device 104*a-n*). The session status database 214 (FIG. 2) may be employed to provide information regarding session start times and other relevant information to assist in such an embodiment.

In a further embodiment of the invention, audio/video programming to be output to a gaming device player during game play may be provided to the controller 102 and/or a gaming device 104*a-n* by a gaming device player (e.g., using the event recording device 106, the World Wide Web or via any other method). For example, the gaming device player may "pre-register" audio/video programming with the controller 102 and/or a gaming device 104*a-n* (e.g., for subsequent use when outcome values are indicated by the provision of audio/video programming to the player).

In yet another embodiment of the invention, the process by which historical audio/video programming is selected for output to a gaming device player may be displayed to the player. For instance, a gaming device 104*a-n* may display a plurality of small windows, each depicting a first scene of different audio/video programming that may be output to the gaming device player (e.g., to indicate one or more outcome values). In a particular embodiment, the gaming device player, the controller 102 and/or a gaming device 104*a-n* may select any one of the audio/video programming options for output to the gaming device player.

In accordance with yet another embodiment of the invention, the provision of historical audio/video information to the gaming device player may entail providing multiple instances of audio video programming relating to a single determination of an outcome value. For example, in accordance with an embodiment where the audio/video programming depicts golfers executing golf shots, the provision of audio/video programming may entail providing three separate audio/video clips (e.g. each of a threesome's tee shots). The outcome value may be determined by or indicated to the player should each of the clips convey successful execution and/or a common result (e.g. all three players reach the green in regulation).

In accordance with yet another embodiment of the present invention, multiple outcome values may be indicated to a gaming device player via the provision of a single instance of audio/video programming. For example, a plurality of outcome values may be interspersed throughout an entire episode of a television sitcom. In accordance with such an embodiment, a given episode may be associated with multiple arrangements for the provision of various outcome values or various combinations of values to be output throughout the episode.

For example, a specific episode of a television sitcom may be associated with multiple payout tables (e.g. each character may be associated with one or more pay tables), one or more of which may be selected (e.g. randomly) by the gaming device and/or controller at the outset of play or at another time. In this manner, a gaming device player may select preferred audio/video content for output, without prior knowledge of the outcome values to be provided. For example, according to one embodiment, a gaming device player may be provided with an outcome value each time a character speaks a particular line, phrase or type of phrase, each time a particular prop, type of prop or set is shown or used, etc. However, in a first viewing of a particular episode, the player may be provided with a first value in response to a character speaking a particular line while in a second viewing of the episode (e.g., one that uses a different pay table to determine values for game results) the player may be provided with a second value that is different from the first value upon the same character speaking the same line.

According to one embodiment, the occurrence of a particular phrase, type of phrase, prop, type of prop and/or set or another event may trigger a bonus event. For example, the player may be entered into a bonus round-type game upon the occurrence of a particular (e.g. hallmark) phrase occurring within the audio/video content being provided. According to another embodiment, the occurrence of a particular phrase, type of phrase, prop or type of prop may trigger a negative outcome (e.g. an outcome having an adverse or downward effect on a player's total balance or a negative effect greater than the player's initial wager). Systems and methods employing negative outcomes are described in applicants' co-pending U.S. patent application Ser. No. 10/420,981, filed Apr. 22, 2003 in the name of Walker et al. and entitled GAMING DEVICE METHOD AND APPARATUS EMPLOYING ALTERNATE PAYOUT FEATURES. The entirety of this application is incorporated by reference herein for all purposes.

According to another embodiment, each character (or groups of similar characters) in a given instance of audio/video programming (e.g. a particular episode of a sitcom) may be associated with multiple pay tables. Upon the selection of audio/video programming and a character (or group of characters) by a gaming device player, the appropriate payout table(s) may be determined by the controller and/or gaming device randomly. For example, the overall expected value of all pay tables associated with a particular character or group of characters may reflect a desired casino or gaming device manufacturer profitability or house edge.

According to yet another embodiment, the audio/video programming itself may act to inform the gaming device player of an outcome value. According to such an embodiment, the controller and/or the gaming device may determine an outcome value to be provided to a player, and subsequently retrieve audio/video corresponding to the outcome value. For example, where it is determined that a gaming device player is entitled to a thirty-coin payout, the controller and/or gaming device may retrieve audio/video that includes a character speaking (or scene showing) the number "30".

Various methods of determining that a character has spoken a particular word or phrase may be used. For example, in one embodiment speech recognition software (e.g., stored in and executed by the gaming device) may be utilized to analyze the characters speech and recognize the word or phrase. For example, the words or phrases spoken by the character (as recognized via the speech recognition software) may be compared to list or database of predetermined words or phrases that may trigger an adjustment of the credit meter balance. In another embodiment, a processor (e.g., of a gaming device) may monitor the time from a beginning of the audio/video content and be programmed to adjust the credit meter balance upon the occurrence of certain times as measured from the starting time of the audio/video content. For example, a table and/or subroutine of the times and corresponding amounts to be added to the credit meter balance may be associated with the audio/video content and used to provide payouts. In a more particular example, a particular episode may be associated with a table and/or subroutine of payouts for the episode. The table may indicate that a first payout (e.g., 5 credits) is to be added to the credit meter balance at five seconds from the beginning of the episode, a second payout (e.g., 20 credits) is to be added to the credit meter balance at fifteen seconds from the beginning of the episode and a third payout (e.g., ten credits) is to be added to the credit meter balance at thirty seconds from the beginning of the episode. The times the payouts are to be provided may be determined beforehand via an analysis of the episode (e.g., a casino or gaming device manufacturer employee may watch the episode and mark the points in the episode at which words and phrases that are to trigger payouts occur, and the corresponding payouts that are to be provided). Of course, one of ordinary skill in the art, upon reading the present disclosure, would understand numerous other methods of determining when a particular word or phrase has been spoken by a character and that a payout is to be provided in response.

In one or more embodiments, a number may be associated with a player (e.g., randomly, based on one or more selections made by or on behalf of a player) and a player may be provided with a payout based on how a number spoken by a character relates to the number associated with the player. For example, if the number "30" is associated with a player, a player may be provided with a payout if a character speaks a number equal or greater than "30" but no payout (or, e.g., a negative payout) if the character speaks a number less than "30."

It should be noted that, in one or more embodiments, the historical audio/video content being output to a player via a gaming device may also be transmitted to one or more other players. For example, a large screen display associated with one or more gaming devices and/or an area of a casino may output historical audio/video content (e.g., an episode of a television show) such that the content can be viewed by all players in the vicinity of the screen. It should further be noted that, in such embodiments, different players may received different payouts based on the same historical audio/video content being transmitted via the large screen display. For example, a first player playing a first gaming device may be associated with a first character and a first phrase while a second player playing a second gaming device may be associated with a second character and a second phrase. Thus, as the episode is output, if the first character speaks the first phrase, a first payout may be added to a credit meter balance of the first gaming device and as the second character speaks the second phrase, a second payout may be added to a credit meter balance of the second gaming device. Thus, multiple players may view the same episode together but be rewarded for, and looking forward to, different events occurring during the episode.

Accordingly, while the present invention has been disclosed in connection with exemplary embodiments thereof, it should be understood that other embodiments may fall within the spirit and scope of the invention as defined by the following claims.

We claim:

1. A method of operating a gaming device including a memory device which stores a plurality of instructions, said method comprising:
   (a) receiving a wager from a player;
   (b) upon receiving the wager from the player, causing a processor to execute the plurality of instructions to randomly generate one of a plurality of different numbers;
   (c) after the random generation of the number, accessing a database that includes each of the plurality of different numbers, each different number being preassociated with one of a plurality of different audio/video segments and one of a plurality of different game results, said audio/video segments produced for a purpose other than for inclusion on the gaming device;
   (d) determining which audio/video segment and game result are preassociated with the randomly generated number regardless of any player input;
   (e) causing at least one display device to display said determined audio/video output segment and said determined game result to the player; and
   (f) determine an outcome value based on the determined game result.

2. The method of claim 1, wherein the database includes information about elements of audio/video content previously output to the player.

3. The method of 1, wherein the audio/video segments include at least one selected from the group consisting of: a television show, an animated show, a movie and a sporting event.

4. The method of claim 1, wherein at least one of the plurality of outcome values is a value less than zero.

5. The method of claim 1, wherein the database includes a plurality of different outcome values.

6. The method of claim 2, wherein the information further includes information about which of a plurality of outcome values were previously displayed to the player.

* * * * *

UNITED STATES PATENT AND TRADEMARK OFFICE
CERTIFICATE OF CORRECTION

| | |
|---|---|
| PATENT NO. | : 8,025,566 B2 |
| APPLICATION NO. | : 10/908688 |
| DATED | : September 27, 2011 |
| INVENTOR(S) | : Jay S. Walker et al. |

It is certified that error appears in the above-identified patent and that said Letters Patent is hereby corrected as shown below:

IN THE CLAIMS:

In Claim 1, column 40, line 26, delete "output."

In Claim 4, column 40, line 37, replace "1" with --5--.

Signed and Sealed this
Third Day of January, 2012

David J. Kappos
*Director of the United States Patent and Trademark Office*